(12) United States Patent
Jaber et al.

(10) Patent No.: US 10,671,879 B2
(45) Date of Patent: *Jun. 2, 2020

(54) FEATURE DENSITY OBJECT CLASSIFICATION, SYSTEMS AND METHODS

(71) Applicant: Nant Holdings IP, LLC, Culver City, CA (US)

(72) Inventors: Mustafa Jaber, Los Angeles, CA (US); Jeremi M. Sudol, Venice, CA (US); Bing Song, La Canada, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,178

(22) Filed: Sep. 11, 2018

(65) Prior Publication Data

US 2019/0012562 A1 Jan. 10, 2019

Related U.S. Application Data

(63) Continuation of application No. 15/656,975, filed on Jul. 21, 2017, now Pat. No. 10,102,446, which is a
(Continued)

(51) Int. Cl.
*G06K 9/52* (2006.01)
*G06T 7/50* (2017.01)
(Continued)

(52) U.S. Cl.
CPC ............ *G06K 9/52* (2013.01); *G06K 9/3258* (2013.01); *G06K 9/4671* (2013.01);
(Continued)

(58) Field of Classification Search
None
See application file for complete search history.

(56) References Cited

U.S. PATENT DOCUMENTS 5,710,833 A   1/1998  Moghaddam et al.
5,768,420 A   6/1998  Brown et al.
(Continued)

FOREIGN PATENT DOCUMENTS

EP   2 366 331 B1   7/2013
GB      2474787 B   3/2013
(Continued)

OTHER PUBLICATIONS

International Search Report and Written Opinion issued in International Application No. PCT/US2014/069407 dated Mar. 27, 2015, 13 pages.
(Continued)

*Primary Examiner* — Iman K Kholdebarin
(74) *Attorney, Agent, or Firm* — Mauriel Kapouytian Woods LLP; Elaine Lee; Andrew Noble

(57) ABSTRACT

A system capable of determining which recognition algorithms should be applied to regions of interest within digital representations is presented. A preprocessing module utilizes one or more feature identification algorithms to determine regions of interest based on feature density. The preprocessing modules leverages the feature density signature for each region to determine which of a plurality of diverse recognition modules should operate on the region of interest. A specific embodiment that focuses on structured documents is also presented. Further, the disclosed approach can be enhanced by addition of an object classifier that classifies types of objects found in the regions of interest.

22 Claims, 23 Drawing Sheets

Related U.S. Application Data continuation of application No. 15/251,546, filed on Aug. 30, 2016, now Pat. No. 9,754,184, which is a continuation of application No. 14/565,342, filed on Dec. 9, 2014, now Pat. No. 9,466,009.

(60) Provisional application No. 61/913,681, filed on Dec. 9, 2013.

(51) Int. Cl.
  *G06T 7/11* (2017.01)
  *G06K 9/32* (2006.01)
  *G06K 9/46* (2006.01)
  *G06K 9/62* (2006.01)

(52) U.S. Cl.
  CPC ............ *G06K 9/6218* (2013.01); *G06T 7/11* (2017.01); *G06T 7/50* (2017.01); *G06K 2009/4666* (2013.01); *G06T 2210/41* (2013.01)

(56) References Cited

U.S. PATENT DOCUMENTS

| | | | |
|---|---|---|---|
| 6,711,293 B1 * | 3/2004 | Lowe | G06K 9/4671 382/219 |
| 6,816,611 B1 | 11/2004 | Hagiwara et al. | |
| 7,627,178 B2 | 12/2009 | Suzuki et al. | |
| 7,643,683 B2 | 1/2010 | Miller | |
| 7,689,321 B2 | 3/2010 | Karlsson | |
| 8,218,850 B2 | 7/2012 | Raundahl et al. | |
| 8,285,019 B2 | 10/2012 | Raundahl et al. | |
| 8,346,684 B2 | 1/2013 | Mirbach et al. | |
| 8,363,939 B1 | 1/2013 | Khosla et al. | |
| 8,379,912 B2 | 2/2013 | Yadid et al. | |
| 8,385,593 B2 | 2/2013 | Urbach et al. | |
| 8,401,308 B2 | 3/2013 | Nakamura et al. | |
| 8,429,103 B1 | 4/2013 | Aradhye et al. | |
| 8,510,238 B1 | 8/2013 | Aradhye et al. | |
| 8,515,136 B2 | 8/2013 | Mori et al. | |
| 8,542,794 B2 | 9/2013 | Miyamoto | |
| 8,553,989 B1 | 10/2013 | Owechko et al. | |
| 8,559,671 B2 | 10/2013 | Milanfar et al. | |
| 9,466,009 B2 * | 10/2016 | Jaber | G06K 9/52 |
| 9,754,184 B2 | 9/2017 | Jaber et al. | |
| 10,102,446 B2 * | 10/2018 | Jaber | G06K 9/52 |
| 2002/0001398 A1 | 1/2002 | Shimano et al. | |
| 2003/0062414 A1 | 4/2003 | Tsikos et al. | |
| 2006/0008151 A1 * | 1/2006 | Lin | G06K 9/48 382/190 |
| 2006/0187305 A1 | 8/2006 | Trivedi et al. | |
| 2007/0005356 A1 | 1/2007 | Perronnin | |
| 2007/0179921 A1 * | 8/2007 | Zitnick | G06K 9/6211 706/20 |
| 2008/0008378 A1 | 1/2008 | Andel et al. | |
| 2008/0008379 A1 | 1/2008 | Andel et al. | |
| 2009/0103814 A1 | 4/2009 | Nakamura et al. | |
| 2009/0116732 A1 * | 5/2009 | Zhou | H04N 13/139 382/154 |
| 2010/0286827 A1 | 11/2010 | Franzius et al. | |
| 2010/0312913 A1 | 12/2010 | Wittenschlaeger | |
| 2011/0038550 A1 | 2/2011 | Obrador | |
| 2011/0081081 A1 | 4/2011 | Smith et al. | |
| 2011/0299770 A1 | 12/2011 | Vaddadi et al. | |
| 2012/0039539 A1 | 2/2012 | Boiman et al. | |
| 2013/0071876 A1 | 3/2013 | Hao et al. | |
| 2013/0142405 A1 * | 6/2013 | Nada | G06K 9/00087 382/124 |
| 2013/0150117 A1 | 6/2013 | Rodriguez et al. | |
| 2013/0170723 A1 | 7/2013 | Kwon et al. | |
| 2013/0216143 A1 | 8/2013 | Pasteris et al. | |
| 2013/0273968 A1 | 10/2013 | Rhoads et al. | |
| 2014/0003674 A1 | 1/2014 | Coley | |
| 2015/0193972 A1 | 7/2015 | Alglreatly | |
| 2015/0221133 A1 * | 8/2015 | Groten | G06K 9/00671 345/633 |
| 2015/0302027 A1 | 10/2015 | Wnuk et al. | |
| 2015/0310628 A1 * | 10/2015 | Burry | G06T 7/246 382/103 |

FOREIGN PATENT DOCUMENTS

| | | |
|---|---|---|
| JP | 5182594 B2 | 4/2013 |
| WO | WO 2007/004868 A1 | 1/2007 |
| WO | WO 2010/143015 A2 | 12/2010 |
| WO | WO 2013/109802 A1 | 7/2013 |
| WO | WO 2013/149038 A1 | 10/2013 |
| WO | WO 2012/142756 A1 | 10/2016 |

OTHER PUBLICATIONS

Zandifar et al., "A video based interface to textual information for the visually impaired," Fourth IEEE International Conference on Multimodal Interfaces, 2002; 6 pages.

Ferreira et al., "A text detection technique applied in the framework of a mobile camera-based application," First International Workshop on Camera-based Document Analysis and Recognition. 2005, pp. 133-139.

Bissacco et al., "PhotoOCR: Reading Text in Uncontrolled Conditions," Computer Vision (ICCV), 2013 IEEE International Conference, pp. 785-792, Dec. 1-8, 2013.

* cited by examiner

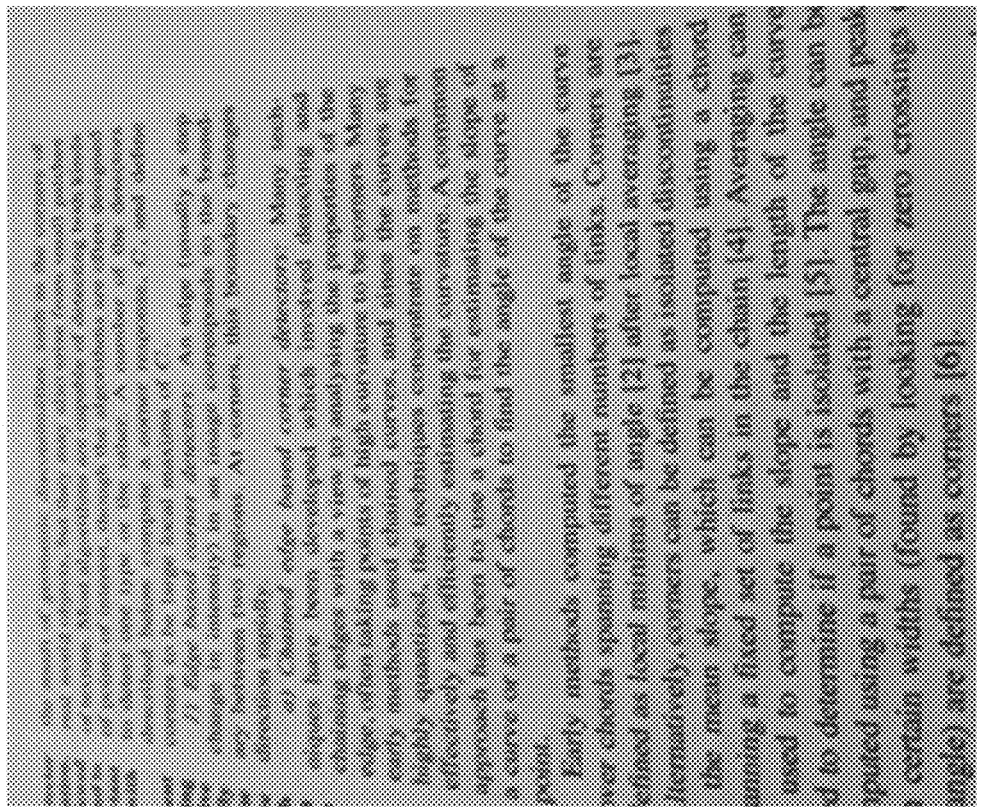
Figure 9

"Zoom In"

"Forward"

"Hold Still"

FEATURE DENSITY OBJECT CLASSIFICATION, SYSTEMS AND METHODS

This application is a continuation of U.S. application Ser. No. 15/656,975, filed Jul. 21, 2017, which is a continuation of U.S. application Ser. No. 15/251,546, filed Aug. 30, 2016, now U.S. Pat. No. 9,754,184, which is a continuation of U.S. application Ser. No. 14/565,342, filed Dec. 9, 2014, now U.S. Pat. No. 9,466,009, which claims priority to U.S. provisional Application No. 61/913,681, filed Dec. 9, 2013. U.S. application Ser. Nos. 15/656,975, 15/251,546, and 14/565,342, U.S. Provisional Application No. 61/913,681, and all other extrinsic references mentioned herein are incorporated by reference in their entirety.

FIELD OF THE INVENTION

The field of the invention is object recognition and classification technologies.

BACKGROUND

The following description includes information that may be useful in understanding the present invention. It is not an admission that any of the information provided herein is prior art or relevant to the presently claimed invention, or that any publication specifically or implicitly referenced is prior art.

Many object recognition technologies have been developed since the advent of digital acquisition techniques. One example technique that can be used to identify objects that might appear in a digital image includes Scale-Invariant Feature Transform (SIFT) as discussed in U.S. Pat. No. 6,711,293 to Lowe titled "Method and Apparatus for Identifying Scale Invariant Features in an Image and Use of the Same for Locating an Object in an Image", filed Mar. 6, 2000. Typically, only one algorithm is applied to a digital representation of a scene to identify or locate an object within the digital representation. Although useful for identifying objects that are amenable to the specific philosophical foundations of the algorithms, such a single minded approach is less than efficient across many different classes of objects; different types of objects across which there can be a high variability in feature density.

Some effort has been applied toward detecting object features. For example, U.S. Pat. No. 5,710,833 to Moghaddam et al. titled "Detection, Recognition and Coding of Complex Objects using Probabilistic Eigenspace Analysis", filed Apr. 20, 1995, describes calculating probabilities densities associated with an image or portions of an image to determine if an input image represents an instance of an object. Still, Moghaddam only offers a single approach for identifying objects and fails to provide insight into classification of objects.

Substantial effort toward image processing as been applied in the field of medical imaging. European patent specification EP 2 366 331 to Miyamoto titled "Radiation Imaging Apparatus, Radiation Imaging Method, and Program", filed Mar. 1, 2011, references calculating image density within a radioscopic image and selectively executing an extraction algorithm for reach region of interest where the density information reflects tissue density. The extraction algorithm results in features that can aid in analysis of corresponding tissue.

U.S. Pat. No. 8,542,794 also to Miyamoto titled "Image Processing Apparatus for a Moving Image of an Object Irradiated with Radiation, Method Thereof, and Storage Medium", filed Mar. 3, 2011, also discusses image processing with respect to radioscopic imaging. Miyamoto discusses capturing a "feature amount" from pre-processed moving images where the "feature amounts" represent values derived from the image data. Thus, the feature amounts can reflect aspects of image data related to region in an image.

U.S. Pat. No. 8,218,850 to Raundahl et al. titled "Breast Tissue Density Measure" filed Dec. 23, 2008, makes further progress in the medical imaging field of extracting tissue density information from radioscopic images. Raundahl describes driving a probability score from the tissue density information and that indicates that a mammogram image is a member of a predefine class of mammograms images. Miyamoto and Raundahl offer useful instructions toward processing medical image data based on extracted features. However, such approaches are not applicable to a broad range of object types, say shoes, animals, or structured documents.

U.S. patent application publication 2008/0008378 to Andel et al. titled "Arbitration System for Determining the Orientation of an Envelope from a Plurality of Classifiers", filed Jul. 7, 2006; and U.S. patent application publication 2008/0008379 also to Andel et al. titled "System and Method for Real-Time Determination of the Orientation of an Envelope", filed Jul. 7, 2007, both describe using a classifier that determines an orientation of an envelope based on an image of the envelope. The orientation classifier operates as a function of pixel density, (i.e., regions having dark pixels).

U.S. Pat. No. 8,346,684 to Mirbach et al. titled "Pattern Classification Method", filed internationally on Jul. 17, 2007, describes identifying test patterns in a feature space based on using a density function. During an on-line process, patterns can be classified as belonging to known patterns based on the known patterns having similar density functions.

International patent application publication WO 2013/149038 to Zouridakis titled "Method and Software for Screening and Diagnosing Skin Lesions and Plant Diseases" filed Mar. 28, 2013, also describes a classification system. Zouridakis discusses extracting features from regions within an object boundary in an image and comparing the extracted features to known object features in a support vector machine (SVM). The SVM returns a classification of the object.

Further, U.S. Pat. No. 8,553,989 to Owechko et al. titled "Three-Dimensional (3D) Object Recognition System Using Region of Interest Geometric Features", filed Apr. 27, 2010, uses a feature vector to classify objects of interest. Shape features are calculated by converting raw point cloud data into a regularly sampled populated density function where the shape features are compiled into the feature vector. The feature vector is then submitted to a multi-class classifier trained on feature vectors.

U.S. Pat. No. 8,363,939 to Khosla et al. titled "Visual Attention and Segmentation System", filed Jun. 16, 2008, discusses applying a flooding algorithm to break apart an image into smaller proto-objects based on feature density where the features represent color features derived based on various color channels. Unfortunately, Khosla merely attempts to identify regions of high saliency, possibly growing the region, rather than attempting differentiate among objects distributed across regions of interest.

U.S. patent application publication 2013/0216143 to Pasteris et al. titled "Systems, Circuits, and Methods for Efficient Hierarchical Object Recognition Based on Clustered Invariant Features", filed Feb. 7, 2013, describes extracting key points from image data and grouping the key points into clusters that enforce a geometric constraint. Some clusters are discarded while the remaining clusters are used for recognition. Interestingly, Pasteris seeks to discard low density sets and fails to appreciate that feature density, regardless of its nature, can represent rich information.

International patent application WO 2007/004868 to Geusebroek titled "Method and Apparatus for Image Characterization", filed Jul. 3, 2006, seeks to characterize images based on density profile information. The system analyzes images to find color or intensity transitions. The density profiles are created from the transitions and fitted to predefined parameterization functions, which can be used to characterize the image.

U.S. Pat. No. 8,429,103 to Aradhye et al. titled "Native Machine Learning Service for User Adaptation on a Mobile Platform", filed Aug. 2, 2012; and U.S. Pat. No. 8,510,238 titled "Method to Predict Session Duration on Mobile Device Using Native Machine Learning", filed Aug. 14, 2012, both describe a machine learning service that seeks to classify features from image data.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The above cited references offer various techniques for applying some form of algorithm to image data to identify objects represented within the image data. Still, the collective references rely on a single algorithm approach to identify features within regions of interest. The references fail to appreciate that each region of interest could have a different type or class of object (e.g., unstructured documents, structured documents, faces, toys, vehicles, logos, etc.) from the other regions. Further, the references fail to provide insight into how such diverse regions of interest could be processed individually or how to determine which type of processing would be required for such regions. Thus, there is still a need for systems capable of determining which type of processing should be applied to identified regions of interest.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which an object data processing system can, in real-time, determine which recognition algorithms should be applied to regions of interest in a digital representation. One aspect of the inventive subject matter includes a system comprising a plurality of diverse recognition modules and a data preprocessing module. Each module represents hardware configured to execute one or more sets of software instructions stored in a non-transitory, computer readable memory. For example, the recognition modules can comprise at least one recognition algorithms (e.g., SIFT, DAISY, ASR, OCR, etc.). Further, the data preprocessing module can be configured, via its software instructions, to obtain a digital representation of a scene. The digital representation can include one or more modalities of data including image data, video data, sensor data, news data, biometric data, or other types of data. The preprocessing module leverages an invariant feature identification algorithm, preferably one that operates quickly on the target data, to generate a set of invariant features from the digital representation. One suitable invariant identification feature algorithm that can be applied to image data includes the FAST corner detection algorithm. The preprocessing module further clusters or otherwise groups the set of invariant features into regions of interest where each region of interest can have an associated region feature density (e.g., features per unit area, feature per unit volume, feature distribution, etc.). The preprocessor can then assign each region one or more of the recognition modules as a function of the region's feature density. Each recognition module can then be configured to process their respective regions of interest according the recognition module's recognition algorithm.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 9 provides an example of a resulting set of features based on applying a FAST corner detection algorithm to an image of printed media.

DETAILED DESCRIPTION

Figure 1:
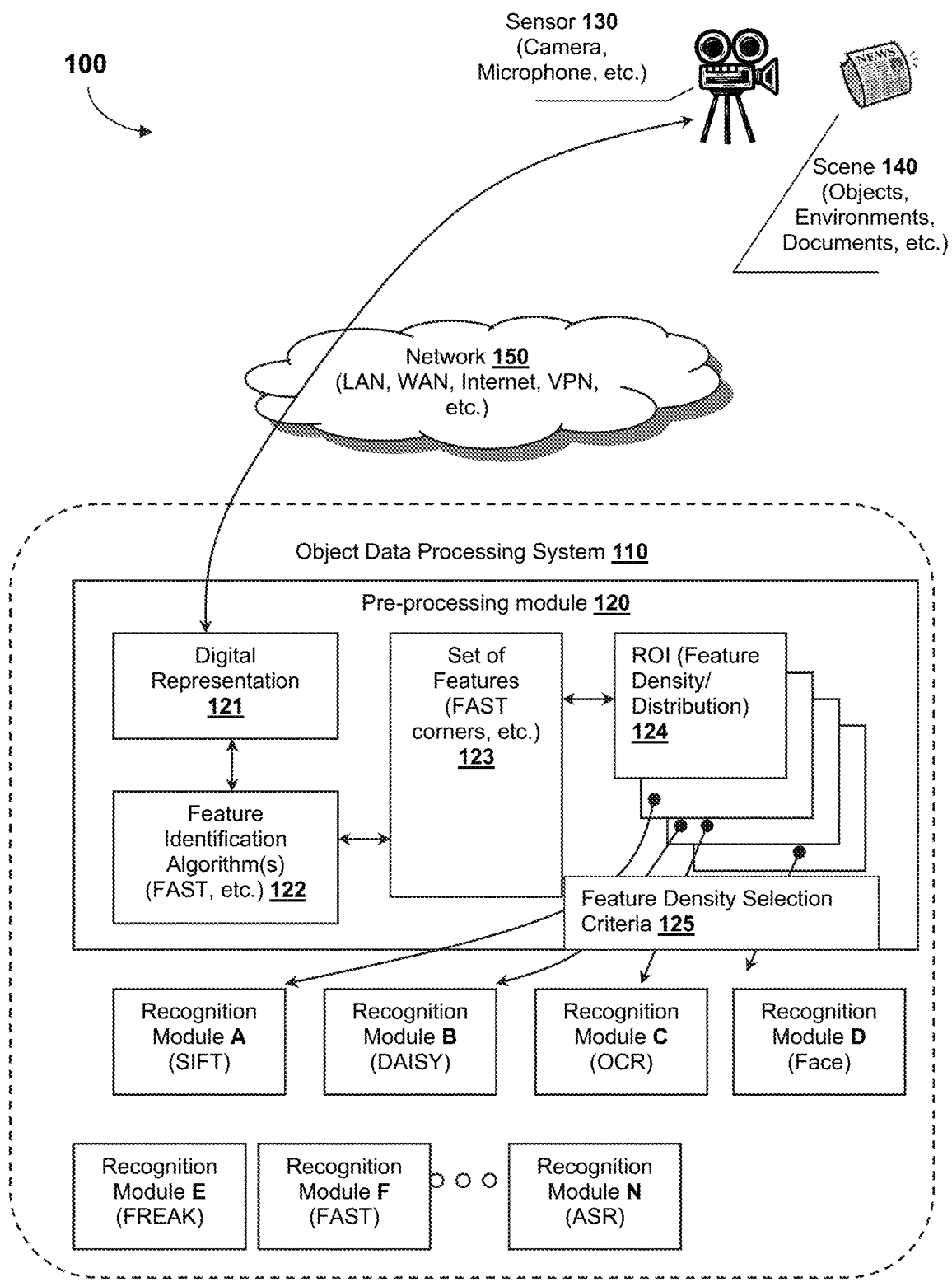
FIG. 1 illustrates an object data preprocessing ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The following subject matter is directed toward systems that process digital representations of a scene to identify one or more objects or classes of objects. Previous techniques are slow and are unsuitable for use in embedded devices having limited resources or merely apply a single processing technique for all purposes. For example, a processing module might a priori assume that a target object of interest is a document and attempt to apply optical character recognition to the object regardless of whether or not the object is a document.

The Applicants have come to appreciate that each type of processing technique has an underlying philosophical approach to analyzing digital data when identifying patterns or objects and that each philosophical approach does not necessarily work across a broad spectrum of object types or classes. Consider a scenario were the digital representation encodes an image of a logo. Logos typically lack texture or features, which render recognition techniques based on SIFT less useful. However, edge detection techniques might be more useful because a corresponding recognition module can construct edges or boundaries associated with the logo and search for similar known objects based on the constructed edges or their corresponding edge descriptors.

Still, it is very difficult for computing systems to determine which type of recognition technique should be applied to a digital representation in order to extract object related information without actually applying each technique separately. Such an approach would be very computationally intensive and resource heavy, which would exceed the patience and good will of a consumer market.

The Applicants have further appreciated that one can quickly determine regions of interest within a digital representation (e.g., video data, video frame, image data, audio sample, documents, etc.) and quickly determine how to differentiate the regions of interest with respect to more optimal recognition techniques. As described below the Applicants have found that one can apply a preprocessing feature identification algorithm to a digital representation to identify regions of interest. The results of the feature identification algorithm include features, descriptors for example, that indicate areas of interest. Each region or area would have a characteristic feature density, which itself would have a signature that can be an indicator of what type of additional processing would be required. Thus, the Applicants have appreciated that there can be correlations among feature density signatures from a first recognition algorithm and classes of additional, different recognition algorithms.

FIG. 1 presents an example ecosystem 100 that preprocesses digital data to determine how various regions of interest should be further processed. Contemplated ecosystems include an object data preprocessing system 110 that quickly analyzes digital representations 121 of a scene 140. The disclosed system 100 is able to process video data from existing cell phones as frame rate (i.e., a series of still frames, including frame rate information). Although the following discussion is mainly presented with respect to an image data modality, it should be appreciated that other data modalities (e.g., video, audio, sensor data, etc.) could benefit from the presented techniques.

The object data processing system 110 comprises a plurality of diverse recognition modules (labeled A-N) and at least one data preprocessing module 120. One should appreciate that the individual components of the object data processing system 110 and/or ecosystem 100 can be housed in a single device (e.g., tablet, smart phone, server, game console, Google Glass, ORCAM® camera, etc.) or distributed across multiple devices. For example, the feature identification algorithms 122 might reside on a smart phone (which can also include or not include a sensor 130 such as a camera) while one or more remote servers house the various recognition modules A-N.

In the example shown, one or more sensors 130 acquire sensor data that form a digital representation 121 of a scene 140. The sensors 130 can include a wide variety of device types including cameras, microphones, Hall probes, thermometers, anemometers, accelerometers, touch screens, or other components or devices that capture sensor data. In view that the sensors 130 could include a broad spectrum of device types, the resulting sensor data as well as the digital representation 121 of the scene can include a broad spectrum of data modalities such as image data, audio data, biometric data, news data, temperature data, pressure data, location data, electrical data, or other types of data.

Each recognition module A-N from the set of recognition modules can comprise one or more recognition algorithms. In embodiments, the recognition modules A-N are classified according to their respective algorithm's underlying philosophical approach (e.g., what types of feature arrangements and pixel arrangements are sensitive to a particular algorithm, what types of recognition or recognition conditions a particular algorithm is best suited to, etc.) to identifying objects. Example types of algorithms can include a template driven algorithm, a face recognition algorithm, an optical character recognition algorithm, a speech recognition algorithm, an object recognition algorithm, edge detection algorithm, corner detection algorithm, saliency map algorithm, curve detection algorithm, a texton identification algorithm, wavelets algorithm, or other class of algorithms. For example, an audio recognition module might have an automatic speech recognition (ASR) algorithm and a support vector machine (SVM)-based algorithm. In more preferred embodiments, each recognition module would likely have a single recognition algorithm so that each module can individually function in parallel on multi-threaded or multi-core system to support parallelism during actual processing.

Each recognition module A-N can further comprise feature density selection criteria that represent characteristics indicative of when the recognition module's corresponding recognition algorithm would be considered applicable. The feature density selection criteria include rules, requirements, optional conditions, or other factors defined based on feature density attributes. It should be appreciated that such attributes can be specific to a particular feature identification algorithm. For example, SIFT recognition module A might have two separate feature density selection criteria, one selection criteria might be relevant when the feature identification algorithm 122 is FAST corner detection and the other selecting criteria might be relevant when the feature identification algorithm 122 is MSER. Each selection criteria could have widely different characteristics depending on the corresponding feature identification algorithm used for preprocessing. Example feature identification algorithms 122 preferably yield invariant features that are invariant with respect to one or more of scale, translation, orientation, affine transforms, skew, speculation, background noise, or other effects. More specific examples of invariant feature identification algorithms 122 include FAST, SIFT, FREAK, BRISK, Harris, DAISY, or MSER. In yet more preferred embodiments, the feature identification algorithm 122 is selected to be faster with respect to processing the digital representation 121 relative to the recognition algorithms in the recognition modules A-N. Further, the feature identification algorithm could also be drawn from the same classes of algorithms are the recognition modules; for example, an edge detection algorithm, a corner detection algorithm, a saliency map algorithm, a curve detection algorithm, a texton identification algorithm, a wavelets algorithm, etc.

In the example shown, the data preprocessing module 120 obtains a digital representation 121 of the scene 140. The digital representation 121 can be obtained through various data communication techniques. In embodiments, the digital representation 121 can be obtained directly from sensor 130. In embodiments, the digital representation 121 can be stored in a common memory on the same device (e.g., a cell phone memory). In embodiments, the digital representation 121 might be obtained via a web service or through one or more known protocols (e.g., FTP, HTTP, SSH, TCP, UDP, etc.). The manner in which the digital representation 121 is obtained can vary depending on the embodiment of the inventive subject matter and/or the configuration of the various components of the ecosystem 100.

Figure 2:
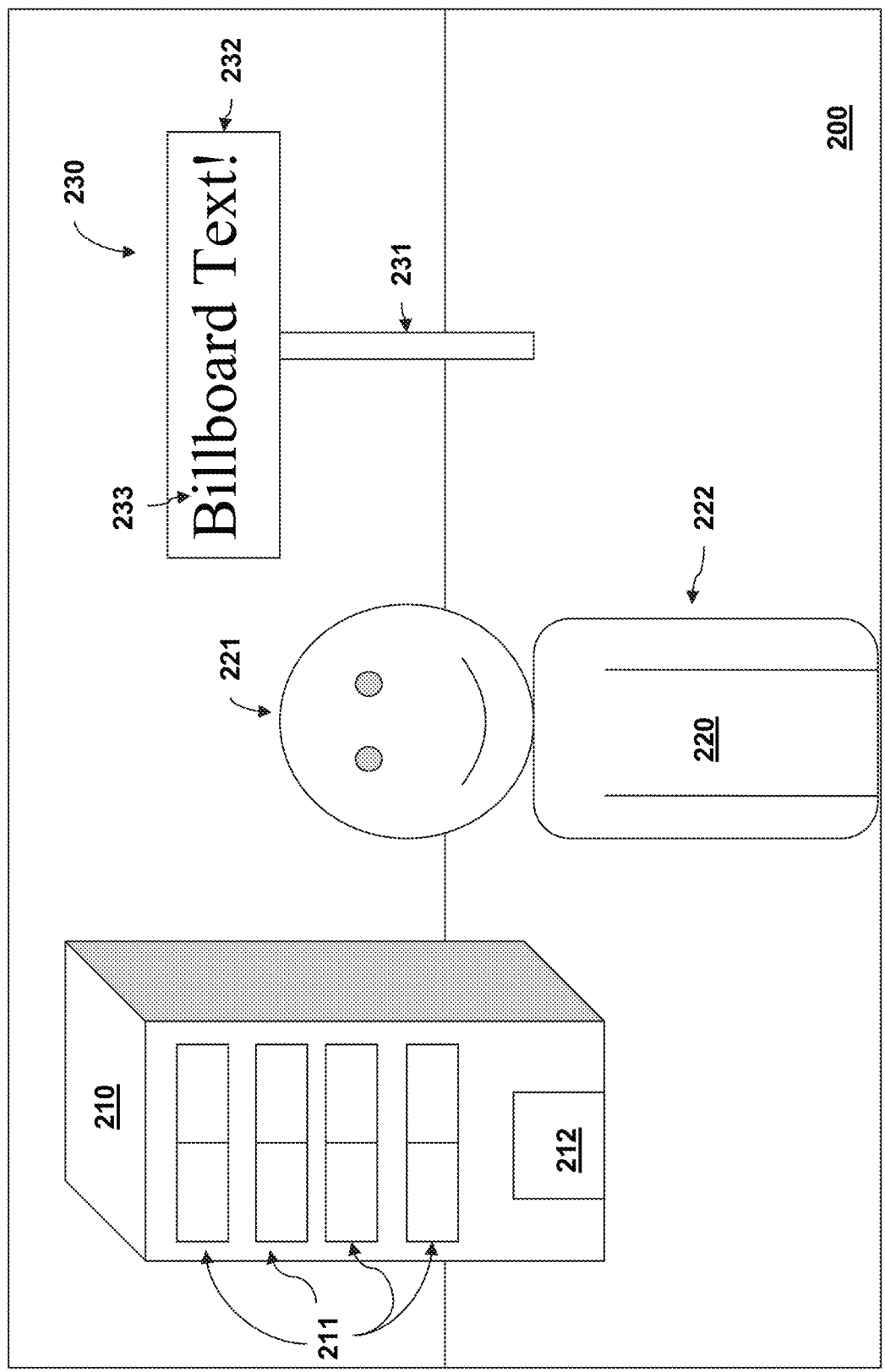
FIG. 2 presents an illustrative example of a digital representation depicting a scene, as used in processing according to aspects of the inventive subject matter.

FIG. 2 provides an example of a digital representation 200 of a scene (corresponding to digital representation 121 of scene 140 of FIG. 1). In the example of FIG. 2, the digital representation 200 is considered to be an image (such as a digital still image or frame of video) of the scene 140. As shown in FIG. 2, the digital representation 200 depicts a scene that includes a building 210 (including windows 211 and a door 212), a person 220 (showing the person's face 221 including eyes and mouth as well as the upper part of their body 222 including their torso and arms) and a billboard 230 (which includes a base post 231, a display surface 232 and text 233 depicted within the display surface 232).

The data preprocessor module 120 generates a set of invariant features 123 by applying the invariant feature identification algorithm 122 to the digital representation 121. Examples of invariant features can include descriptors, key points, edge descriptors, or other types of features.

Figure 3:
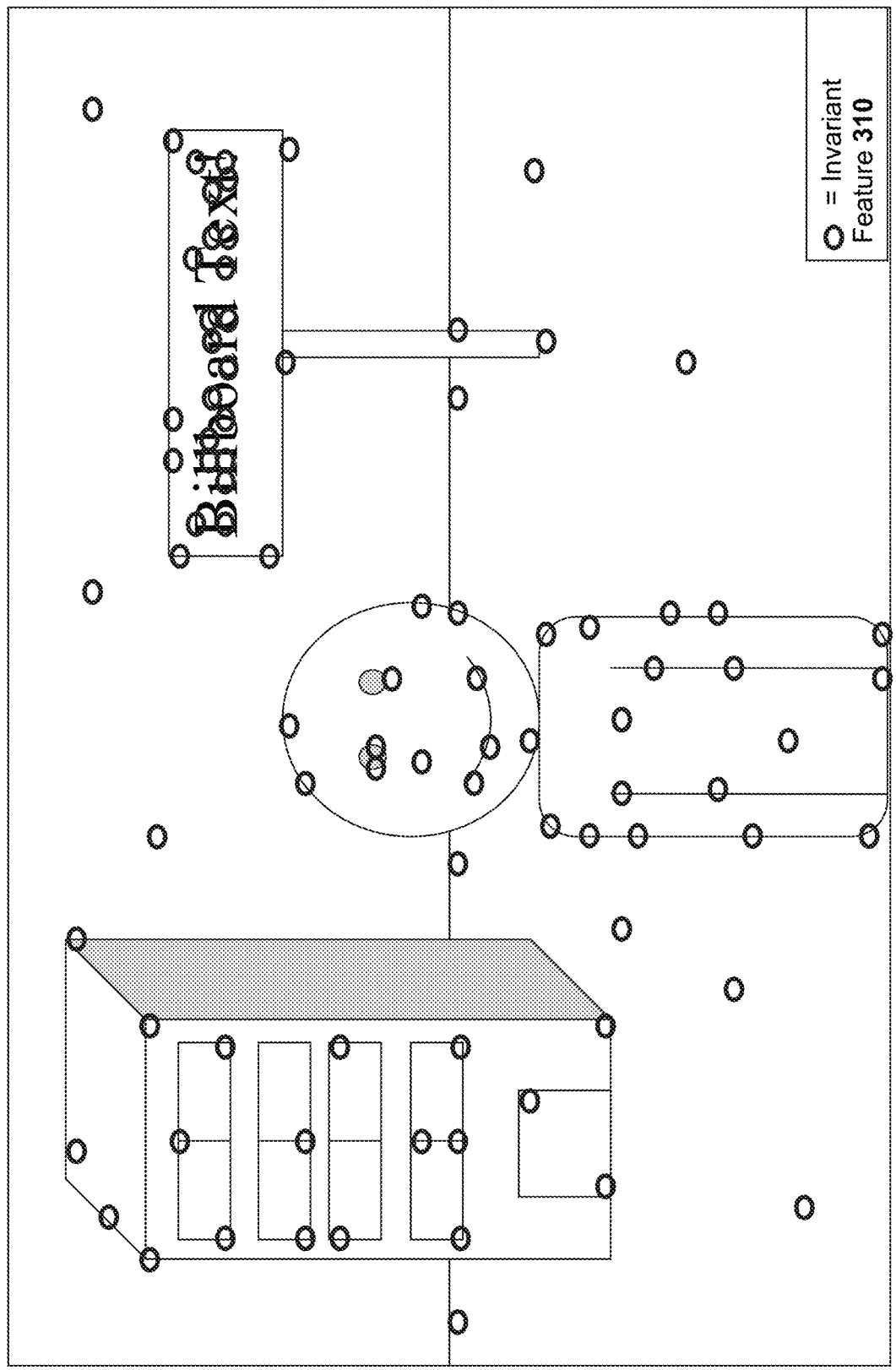
FIG. 3 presents an illustrative example of features generated for the scene of FIG. 2.

FIG. 3 illustrates the generated set of invariant features 123 for the digital representation 200 of FIG. 2, resulting from the application of invariant feature identification algorithm 122 to by the data preprocessor module 120. In FIG. 3, each individual invariant feature 310 is depicted as a bold circle, generated by the invariant feature identification algorithm throughout the digital representation 200. It should be noted that the set of invariant features 310 in FIG. 3 is an illustrative example rather than an exact representation of the results of a particular invariant feature identification algorithm 122. Thus, it is appreciated that for a particular invariant feature algorithm 122, the amount of features and their locations can vary based on a number of factors including the quality and characteristics of the digital representation. Similarly, the amount of generated features and their locations generated by various invariant feature algorithms 122 can differ for the same digital representation.

Generally speaking, the feature identification algorithms generate features based on variations or differences between the characteristics of different pixels within an image. While different feature identification algorithms may have different philosophical approaches to generating features that make different pixel arrangements sensitive to a particular algorithm (e.g., FAST looks for corners whereas SIFT looks for gradients), in general a degree of variation between pixels in an image is needed to generate the features. Correspondingly, sections of an image with little to no pixel variation are generally less likely to give rise to generated invariant features than those with greater pixel variation. Thus, shown in FIG. 3, the "objects" (the building, person sign post, as well as the horizon) in the image are shown to have more features 310 than the relatively uniform area above the horizon (here, a cloudless, clear sky) or below the horizon (here, a relatively visually uniform ground). However, features may still be generated in these areas due to factors that might cause pixels to differ from those in the otherwise uniform area such as image data errors, artifacts of a lens used (e.g. distortion, filters, dirt or scratches on the lens, glare, etc.). Nevertheless, as illustrated in FIG. 3, these features will generally be of a reduced number relative to the features generated because of the larger pixel differences in the "objects" in the image.

Each feature 310 can include a coordinate with respect to the digital representation 200. With respect to an image, the feature coordinates can comprises a pixel coordinate (x, y) in the image. With respect to video data or audio data, the coordinates could also include a time component, a frame count component or other component indicative of a temporal location of the pixel within the video or audio data relative to the beginning, ending or other reference point within the video or audio data. In some embodiments, the coordinates can be with respect to a multi-dimensional feature space or descriptor space rather than with respect to the digital representation 121.

Figure 4:
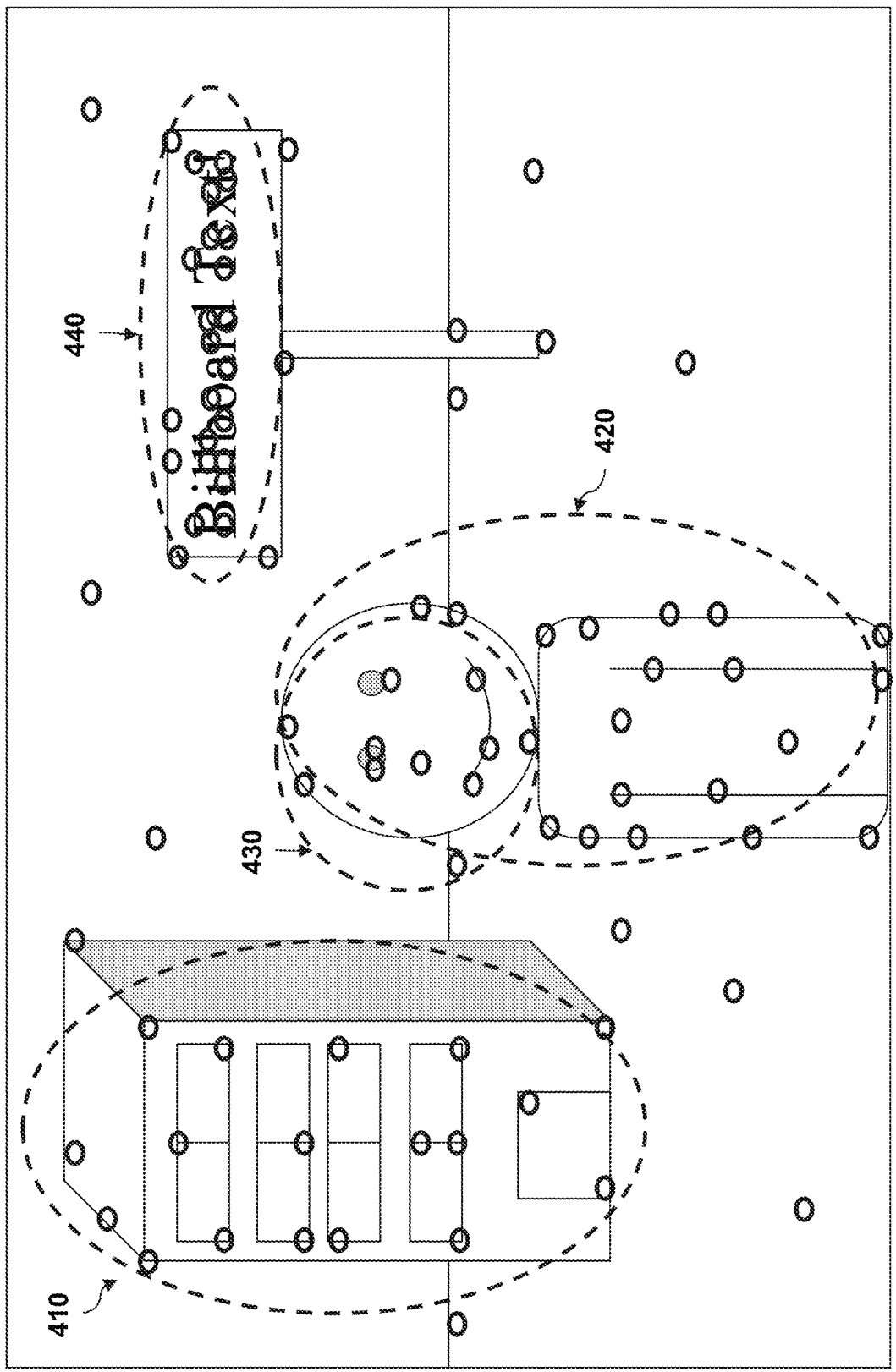
FIG. 4 illustrates clusters generated for the generated features of the scene.

Once the set of invariant features 123 has been generated, the data preprocessor module 120 can proceed to cluster the set of invariant features 123 into regions of interest in the digital representation of the scene. In some embodiments, the data preprocessor module 120 can apply one or more clustering algorithms to the set of invariant features 123 to generate clusters. Examples of suitable clustering algorithms include K-means clustering algorithms, EM clustering algorithms, or other types of clustering algorithms. FIG. 4 illustrates the clusters 410,420,430,440 generated for the set of invariant features 123 generated in FIG. 3 for the digital representation 200 by the data preprocessor module 120 via the clustering algorithm(s). It should be noted that generated clusters of features can overlap. For example, cluster 420 and cluster 430 in FIG. 4 have a degree of overlap.

Figure 5:
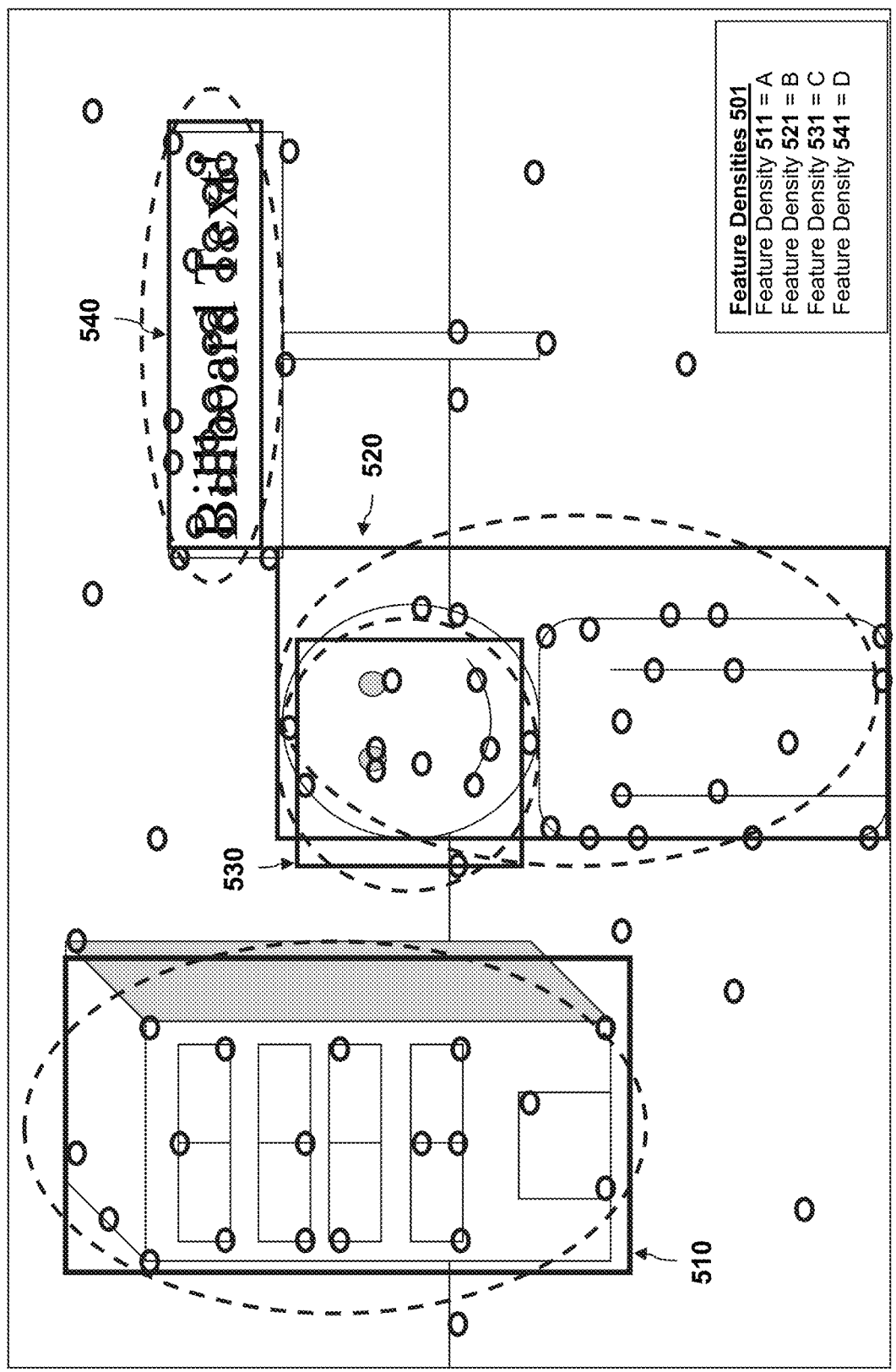
FIG. 5 provides an illustrative examples of the regions of interest corresponding to the clusters of FIG. 4, and examples of feature densities corresponding to the regions of interest.

Having identified clusters 410,420,430,440 of features 310, the data preprocessing module 120 can partition the space in which the clusters reside such that each partitioned portion of the space represents a region of interest 124. FIG. 5 shows an illustrative example of regions of interest 510, 520,530,540 corresponding to each cluster 410,420,430,440, respectively.

As described above, invariant features 310 tend to be generated in greater numbers and density for areas with greater pixel variations. These areas can correspond to objects (or sections of objects) and/or text of interest in a scene. Because the regions of interest 124 correspond to clusters reflective of the distribution of features 310 in a scene according to these pixel variations, the regions of interest 124 can, in embodiments, be considered to represent physical objects (or portions thereof) and/or text in the scene.

In some image-based embodiments (such as the one illustrated in FIG. 5), the region of interest can correspond to a bounding box that substantially surrounds, to within thresholds, the corresponding cluster. In view that clusters can be close to each other (or even overlap), such bounding boxes could overlap each other. For example, in FIG. 5, the bounding boxes corresponding to regions of interest 520 and 530 are shown to overlap.

In other embodiments, the partitioned regions of interest 124 could include shapes (e.g., circles, ellipses, etc.), volumes (e.g., sphere, rectilinear box, cone, etc.) or even higher dimensional shapes. The space does not necessarily have to be tessellated into regions of interest, but could be tessellated via Voronio decomposition if desired. Thus, the digital representation 121 can be decomposed into regions of interest 124 having clusters of invariant features.

An alternative approach to identifying a region of interest 124 can include configuring the preprocessing module 120 to require a set number of features 310 per region and then scaling the region's boundaries so that the region 124 has the required number of features 310. For example, if the number of features is set to a value of 20 for example, the bounding box around a representation of a human face in an image might be relatively larger, perhaps several hundred pixels on a side. However, the bounding box around text having 20 features might be relatively small, perhaps just a few tens of pixels on the side. The inventive subject matter is therefore considered to include adjusting the boundary conditions of a region of interest 124 to enforce a feature count.

The clusters of invariant features 310 within each region of interest can take on different forms. In some embodiments, the clusters could represent a homogeneous set of invariant features. For example, when only FAST is used during preprocessing, the clusters will only include FAST descriptors. Still, it other embodiments, more than one invariant feature identification algorithm could be applied during preprocessing in circumstances where there are sufficient computing resources. In such cases, the clusters could include a heterogeneous set of invariant features (e.g., FAST and FREAK) where each type of feature can provide differentiating information (e.g., scale, orientation, etc.).

The data preprocessing module 120 can be programmed to filter invariant features 310 within a cluster, or across all clusters, based on one or more quality measures. For example, in embodiments that yield a saliency measure, the saliency measure can be used to reduce or otherwise modify the set of invariant features to include features of most merit. In these embodiments, a principle component analysis (PCA) can be used on a training image set to determine which dimensions of a descriptor or feature offer the greatest discriminating power among known objects in the training set. The resulting principle components yield values that indicate which dimensions have the most variance. In such scenarios the saliency measure can include a metric derived based on which features have values in dimensions having the greatest variances. In one example, the saliency metric can include a simple number indicating which dimensions with non-zero values in a feature (such as a SIFT descriptor) correspond to the principle components generated by the PCA. It should be appreciated that the modification of set of invariant features can occur before clustering or after clustering. Consider a scenario where FAST is used as a preprocessing feature identification algorithm. The FAST features can be filtered based on the saliency measure before clustering begins. Alternatively, the clusters can first be identified, and then analyze the saliency measures of the FAST features within each cluster to aid during classification. In these situations, a low-average saliency measure (e.g., a number indicating that a corresponding feature is not likely to be very useful in the analysis) of a cluster can be an indication of a 3D object while a relatively high-average saliency measure (e.g., a large number indicating the corresponding feature is likely to be useful in the analysis) of a cluster can indicate a region of text.

Each type of descriptor or feature resulting from the invariant feature identification algorithm can carry additional information beyond merely representing a descriptor. Such additional metadata can be considered reflective of the feature identification algorithm's underlying assumptions. FAST generates a large number of descriptors, which is useful for fast region identification but does not necessarily provide additional information. SIFT, on other hand, albeit somewhat slower than FAST generates descriptors that provide orientation, scale, saliency, or other information, which can aid in region identification or classification. For example, a text region would likely have a certain number of features that relate to a specific scale. Orientation information can aid in determining how best to orient the text region given the number of features and information from the associated descriptors in the region. SIFT is sometimes more advantageous than FAST in embodiments that would use SIFT for generic object recognition later in the analysis stream.

Each region of interest has one or more clusters distributed within the region's corresponding partitioned portion of the space. The region's local space could be an area within an image (e.g., px^2 (area of pixels squared), cm^2, etc.), a volume (e.g., cm^2*time, cm^3, etc.), or other volume. Further, each region can have a corresponding region feature density that is characterized by the nature of the cluster of invariant features distributed over the region of interest 124's space.

In embodiments, the preprocessing module 120 can be programmed to consider only clusters and/or regions of interest having at least a minimum feature density and to discard or filter out clusters or regions of interest whose density falls below the minimum feature density threshold. The minimum feature density threshold can be a threshold corresponding to the minimum density necessary for any of the recognition algorithms to be able to perform recognition at an acceptable rate.

In embodiments, the feature density of a region of interest 124 can be in the form of a simple scalar density metric such as a raw density comprising the number of features 310 of a region divided by the area (or volume) of the region's corresponding space. Further, as discussed above, the region feature density can be representative or reflective of a homogeneous set of invariant features or a homogeneous set of invariant features depending on how many invariant feature identification algorithms 122 are applied during preprocessing.

The region feature density can further comprise additional values or structure beyond a simple scalar density metric, especially depending on the nature of the cluster within the region of interest. In some embodiments, the distribution of features within the cluster or within the region could include feature substructure. Example substructure can include multiple smaller clusters, a sub-cluster of invariant features, a periodicity of invariant features, a block structure of invariant features, a frequency of invariant features, a low density region of invariant features, patterns, contours, variance, distribution widths, type of distribution (e.g., Gaussian, Poisson, etc.), centroids, or other types of structure.

The data preprocessing module 120 utilizes each region of interest's region feature density to determine which type or types of recognition algorithms would likely be efficient to apply to the region. The data preprocessing module 120 assigns each region of interest 124 at least one of the recognition module(s) A-N as a function of the region feature density (of the region) and one or more feature density selection criteria 125 associated with the recognition modules A-N. In embodiments, the selection of the recognition module(s) A-N for a region of interest 124 can also be as a function of the invariant feature substructure.

In embodiments, the preprocessing module 120 can access a database or lookup table of recognition modules (stored in a non-transitory computer readable storage medium that can be a part of or accessible to the object data processing system 110) that is indexed according the structure, substructure, or other region feature density characteristics. For example, the database or lookup table could index the recognition modules A-N by raw feature density (or a range of raw feature density values associated with each recognition module). One should note that each recognition module A-N can also be multi-indexed according to the various characteristics (e.g., type of distribution, contour information, etc.). In this embodiment, the indexing system can be considered the selection criteria 125. In embodiments, each recognition module A-N can include metadata that represents its specific feature density selection criteria 125.

The feature density selection criteria 125 can include various parameters, requirements, rules, conditions, or other characteristics that outline the feature-density-based context to which a particular recognition module is considered relevant. As stated above, such a context would likely be different for each feature identification algorithm of the modules A-N used in processing. The "feature density" upon which the feature density selection criteria 125 can be defined in a plurality of forms. It is contemplated the criteria 125 can include rules that operate as a function of feature densities such as features per unit time, feature per unit area (e.g., units of pixels squared), features per geometrical area (e.g., # features/cm^2), features per unit volume, features per pixels squared times a depth of field (e.g., a derived volume), feature per unit geometric volume (e.g., # features/cm^3), or other density calculation. Additionally, the selection criteria 125 could include a low density threshold possibly representing a minimum density (i.e., the minimum density necessary for a particular recognition module to be effective or to be preferable over other recognition modules), high density threshold possibly representing a maximum density (i.e., the maximum density for which a particular recognition module is considered to be effective or preferable over other recognition modules), and/or a feature density range applicable for each recognition module A-N (i.e., the feature density range between a minimum and maximum in which a particular recognition module is deemed most effective and/or preferred over other available recognition modules).

Feature density thresholds can be used to categorize ranges of feature densities and thus narrow down potential applicable modules for selection. The categorization can be reflective of the underlying philosophical approaches of types of modules, such that the proper categories (along these philosophies) can be pre-selected by preprocessing module 120 prior to the selection of the actual modules to employ. For example, a feature density threshold can be used to classify densities above a particular value as "high density" and below the value as "low density." For example with respect to image data, if a FAST algorithm discovers a low density region, then this might indicate a region of interest 124 that would best be served by an edge-detection algorithm because the region is texture-less. However, if the FAST algorithm identifies region of interest having a high feature density, then the region of interest might require a SIFT-based algorithm. Still further, if the feature density falls within a range, the region of interest might be better served by an OCR algorithm because the range is consistent with text.

Returning to the example of FIG. 5, the preprocessing module 120 is programmed to calculate feature densities 511,521,531,541 associated with regions of interest 510,520, 530,540, respectively (collectively referenced as feature densities 501). As shown in FIG. 5, feature densities 511, 521,531,541 each have their respective feature density values "A", "B", "C" and "D". For this example, the feature densities 501 are considered to be a raw density of a number of features per area unit.

Having calculated the feature densities 501 for all of the regions of interest, the preprocessing module 120 proceeds to apply the feature densities 501 for each region of interest 510-540 to the feature density selection criteria 125 for each of the recognition modules A-N. In this example, it is assumed that the feature density selection criteria 125 for each of the recognition modules A-N includes a feature density range for which each recognition module is deemed the "correct" module and as such, each of the values "A", "B", "C" and "D" will fall within the feature density range of at least one of the recognition modules A-N (as described above, clusters or regions of interest below a minimum feature density can be filtered out; it is assumed that in the example of FIG. 5, all of the regions of interest are above the minimum feature density).

Figure 6:
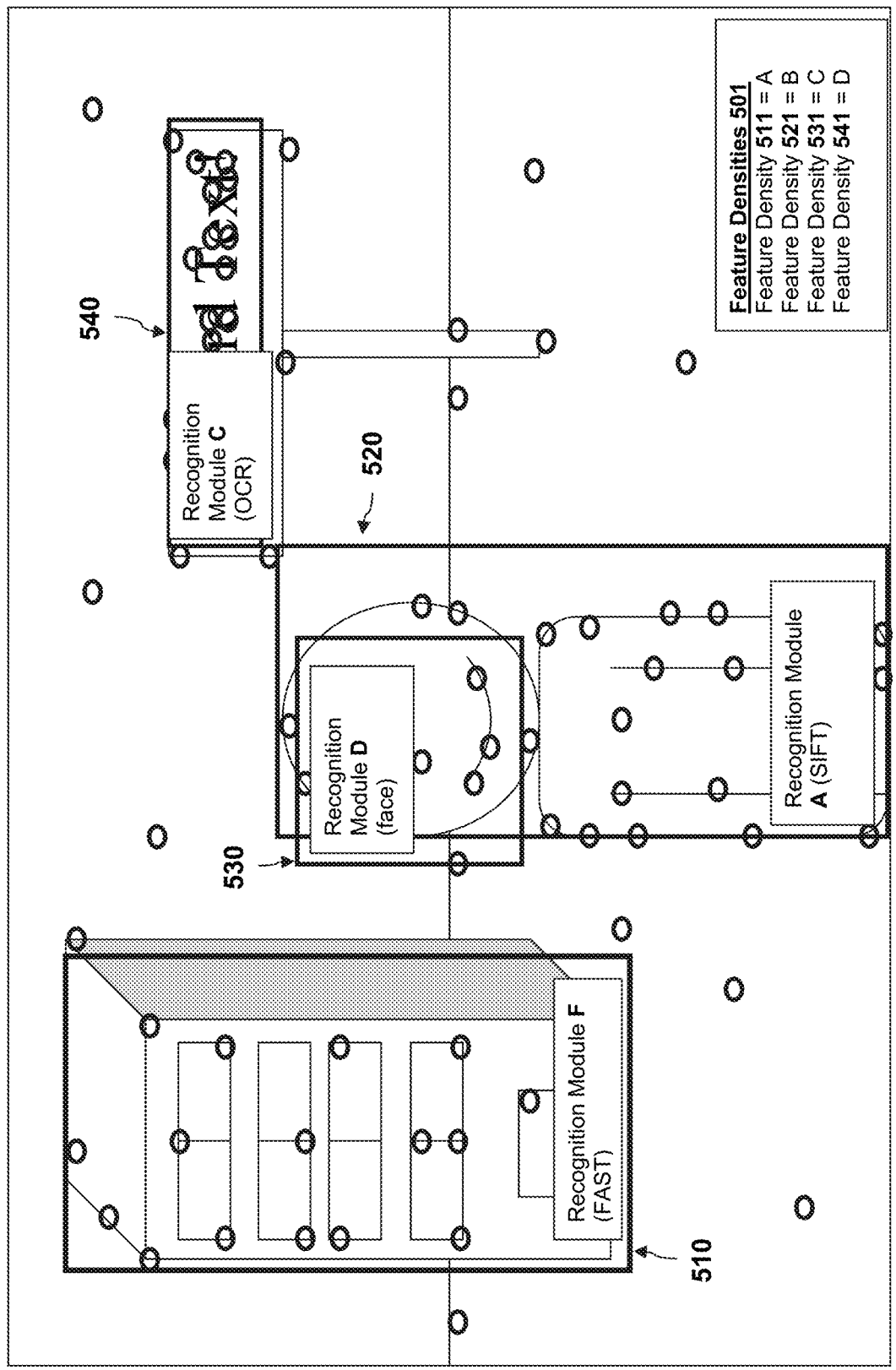
FIG. 6 illustrates the assigned recognition modules according to the feature densities of FIG. 5.

The preprocessing module 120 proceeds to determine that the value "D" (corresponding to feature density 541 of region of interest 540) falls within the feature density selection criteria for recognition module C (an OCR recognition module), as the feature density reflects that typically found in text. Similarly, preprocessing module 120 proceeds to determine that the value "C" (corresponding to feature density 531 of region of interest 530) falls within the feature density selection criteria for recognition module D (a face recognition module), as the feature density and distribution reflects that typically found in facial features. For region of interest 520, the preprocessing module 120 determines that the feature density value "B" of feature density 521 falls within the feature selection criteria range of a recognition module useful in detecting gradients (such as SIFT), as the feature density 311 reflects an amount and distribution of features 310 generated according to the wrinkles and textures of clothing and body parts of a person 220. Finally, for region of interest 510, the preprocessing module 120 determines that the feature density value "A" of feature density 511 falls within the feature selection criteria range of a recognition module useful in detecting edges without much surface texture or variations (such as FAST), as the feature density 511 reflects the amount and distribution features 310 generated according to the hard edges and planar, featureless surfaces of building 210 (and its door 212 and windows 211). FIG. 6 illustrates the selected recognition modules as assigned to each region of interest 510-540.

In some embodiments, the preprocessing module 120 can assign recognition modules to the regions of interest 124 based on additional factors beyond feature density. In embodiments where the digital representation 121 includes additional information about the scene or other circumstances under which the digital representation 121 was captured, the preprocessing module 120 can be programmed to derive one or more scene contexts from the additional information.

In embodiments, the system can store pre-defined scene contexts having attributes to which the preprocessing module 120 can match the additional information included in the digital representation 121 to a corresponding context. The scene contexts can be embodied as entries within a scene context database indexed according to context attributes and including context data, or as independent data objects having context attributes and context data. The context data of a particular scene context is generally considered to be data or information that can influence the selection of a recognition module for one or more regions of interest 124 to reflect the particular scene context.

In an illustrative example, preprocessing module 120 can determine that a digital representation 121 has been captured within a "natural area" as determined from GPS coordinates (e.g., the GPS coordinates associated with the digital representation 121 matches coordinate attributes of an area associated with a "natural area" scene context). The context data of the matched "natural area" scene context then indicates that it is more likely that an object recognition module (e.g., plant recognizers, animal recognizer, etc.) would be more appropriate than an OCR module using one or more of the techniques discussed below. Example types of data that can be utilized with respect to deriving scene context include a location, a position, a time, a user identity (e.g., user information from public sources and/or from a subscription or registration with a system providing the inventive subject matter, a user profile, etc.), a news event, a medical event, a promotion, user preferences, a user's historical data, historical data from a plurality of users, or other data.

In embodiments, a context data can be in the form of a modification factor associated with the scene context. The modification factor serves to modify the process of selecting a recognition module for a region of interest 124 to reflect an increased or decreased likelihood that a particular recognition module is applicable to the digital representation in the particular context of the scene.

In one aspect of these embodiments, the preprocessing module 120 can apply the modification factor to the feature density selection criteria 125 itself and thus modify the criteria that is used with the feature density values for the regions of interest 124. For example, the modification factor value can be applied to thresholds or feature density ranges applicable to one or more of the recognition modules A-N such that a particular threshold or range is modified. Consequently, a recognition module that would have fallen outside of a threshold or range for a particular region of interest 124 before the modification value is applied could be found to be within the modified threshold or range after the application of the modification factor value.

In another aspect of these embodiments, the preprocessing module 120 can apply the modification factor to the calculated feature densities one or more of the generated region(s) of interest 124 within digital representation 121. Here, the modified feature densities of the regions of interest 124 are then used by the preprocessing module 120 as the inputs to the feature density selection criteria 125 to select the appropriate recognition module for each region of interest.

It is contemplated that the two aspects of these embodiments described above can be used separately or in combination to modify the recognition module selection process. In these embodiments, the modification factor can be a linear or non-linear scalar or function applied to the feature density selection criteria 125 and/or the feature densities themselves to result in the modification.

In embodiments, context data can include an identifier of an object or an object class that is highly likely to appear in the digital representation, and can further include a probability or likelihood indicator for the object or object class. Based on the probability indicator, the preprocessing module 120 can select one or more recognition modules that are a priori determined to be applicable to the object or object class. This selection can be in addition to or instead of the recognition modules selected for the regions of interest 124 via the feature density selection criteria 125. For instance, in the "natural area" example described above, the object recognition module is selected by the preprocessing module 120 for all regions of interest 124 in the digital representation 121 even if the feature density selection criteria 125 results in the selection of an OCR module, and this can override the selection of the OCR module or, alternatively, be used for the particular region of interest 124 in combination with the selected OCR module. In a variation of these embodiments, the object identifier and/or the probability indicator can be used as a "tie-breaker" in selecting the applicable recognition module. For example, the results of the feature density selection criteria 125 for a region of interest 124 may result in more than one applicable recognition module. To decide which of the potential candidate modules to employ, the preprocessing module 120 can apply the object (or object class identifier) and determine which (if any) of the candidate modules has been a priori determined to be applicable to the particular object or object class and select accordingly. Where more than one candidate module fits the object/object class, the probability indicator can be applied as a weighting factor for each candidate to determine a winner.

In embodiments, the context data can include an identification of one or more recognition modules that are to be eliminated from consideration. In these embodiments, the preprocessing module 120 can perform error-detection functions by checking for "false positive" recognition module identification. To do this, the preprocessing module 120 can check the identified recognition module(s) in the context data against those selected for each region of interest 124 (selected according to the processes of the inventive subject matter described herein) in the digital representation 121 and determine if there are any matches. If a match results, the matching recognition modules can be flagged as errors by the preprocessing module 120. In embodiments, error messages can be generated and provided to system administrators via email or other form of notification. In embodiments, the selection process can be re-executed to determine whether the error was a single anomaly or a systemic error for correction and flagged accordingly. In embodiments, a different recognition module can be selected to replace the erroneous recognition module whose feature density selection criteria 125 is satisfied by the feature density (and other characteristics) of the particular region of interest 124.

As the recognition modules A-N are assigned to the regions of interest 124, the preprocessor module 120 can configure the assigned recognition modules to process their respective regions. The recognition modules A-N can be instructed to process the regions serially or in parallel depending on the nature of the processing device. In a single processing core computing device, if desired, the recognition modules A-N can be ordered for execution or ranked based on relevance to their regions based on matching scores with respect to the selection criteria. In multi-core computing devices, the recognition modules can be allocated to various cores for parallel processing. In other embodiments, the recognition modules can execute their tasks on remote devices including remote servers, web services, cloud platforms, or even networking infrastructure (e.g., switches, see U.S. patent application U.S. 2010/0312913 to Wittenschlaeger titled "Hybrid Transport-Application Network Fabric Apparatus", filed Aug. 3, 2010).

The relevance of the regions in selecting an order of execution can be further affected by other factors such as entered search terms, a user profile, or other information. For example, in response to a user-entered search query for a type of car in an image, the preprocessing module 120 can prioritize the execution of recognition modules that are most closely related to identifying real-world objects and delay any OCR or other text-recognition modules. In another example (illustrated further via a use-case example below), a user profile can indicate that a user is visually-impaired and, as such, in executing modules for an image including text and objects (such as a newspaper page), the OCR modules can be prioritized over other modules to speed up the ability for the audio output modules of a reading program to execute and read the text out loud to the user.

In view that each recognition module A-N can be aligned with a philosophical approach to object recognition processing and that their associated recognition algorithms operate best on different classes of objects, is should be appreciated that the disclosed preprocessing techniques can also be leveraged to classify the regions of interest with respect to a type of object. Therefore, in embodiments, the preprocessing module 120 can include a region classifier that can be configured to classify the regions of interest 124 according to an object type as a function of attributes derived from the region feature density (e.g., raw density, shape, distribution, etc.) and digital representation (e.g., location, position, context, etc.). Thus, in these embodiments, the feature density selection criteria 125 can also be considered a feature-density-based object type or object class signature. Object classes can include a face, an animal, a vehicle, a document, a plant, a building, an appliance, clothing, a body part, a toy, or other type of object. Example attributes that can be leveraged for the classifier can include interrelationship metrics derived directly from the region feature density, or even among multiple feature densities across multiple regions of interest (e.g., a geometric metric, a time-based metric, an orientation metric, a distribution metric, etc.). Such an approach is considered advantageous for compound objects having multiple parts (e.g., animals, people, vehicles, store shelves, etc.). In the example of FIG. 5, an interrelationship metric can exist between the region of interest 530 (corresponding to the face) and the region of interest 520 (the region corresponding to the person's body) such that, because the region classifier classifies the region of interest 530 as likely to be a face (due to the raw density, shape and distribution of features 310 within ROI 530 being within a certain degree of similarity to the signature of the "face" object class), the preprocessing module 120 interprets the region of interest 520 as having a likelihood of corresponding to the "body" given region of interest 520's position relative to the "face" region of interest 530. Additional information that can aid in region classification can relate to the nature of the region, perhaps black on white text, white on black text, color text, classification of font, or other information.

Contemplated region classifiers can include additional roles or responsibilities beyond classifying regions as relating to specific object types. One example additional responsibility can include assigning a likelihood score to a region where the score indicates that the region of interest is associated with a class of objects. In some embodiments, the object class likelihood can have a fine level of granularity that ranges from a region level down to a pixel level (i.e., assuming image data). Thus, each pixel in a region of interest can include metadata that indicative of the object classes that might be relevant to that pixel. The object class information or metadata can be order according to a likelihood function and could be organized according a table, linked list, or other suitable data structure. Therefore, the region classifier could be considered a pixel-level classifier.

As discussed above, the regions of interest can be associated with one or more different types of objects represented within the region of interest, including physical objects. Of particular interest are regions of interest that represent at least one printed media (e.g., poster, document, billboard, news paper, book, comic box, magazine, coupon, driver's license, etc.) in the scene. Contemplated printed media can include a financial document (e.g., a check, credit card, currency note, etc.), a structured document (e.g., a template-based document, a government-issued document, etc.), advertisement media, etc. The following is a use case illustrative of the incorporation of the inventive subject matter as described herein. In this use case, the systems and methods of the inventive subject matter are implemented in a system that helps a visually-impaired person read a newspaper.

Typically, printed newspaper will include sections of text (such as the headlines, articles, etc.) as well as areas including imagery (e.g., photographs, advertisements, logos, etc.). In this example, a visually impaired user possesses a smartphone including a camera and that has been equipped with the object data operating system 110 of the inventive subject matter. As part of the installation process, the user creates a user profile and includes the information that the user is visually impaired, which is stored as context data in the system.

When the user desires to "read" a newspaper, the user holds the smartphone such that the camera captures at least part of the newspaper page (the user can first be required to open or otherwise initialize an application that invokes the object data operating system 110 to begin). As described above, the preprocessing module 120 receives the image data and executes the feature identification algorithms 122 (FAST, etc.) on the image of the newspaper and generates the features, performs the clustering and determines the regions of interest for the image, including regions of interest corresponding to the text on the newspaper page and regions of interest for the photographs on the newspaper page. Based on the feature density selection criteria 125, the preprocessing module 120 determines that the OCR module is applicable to the text and other recognition modules are applicable to various aspects of the photographs and logos.

The preprocessing module 120 applies the available context data (i.e., "the user is visually impaired"), which includes rules that prioritize the execution of the OCR module. Thus, a text "reader" program within the smartphone can begin reading the text to the user as quickly as possible. If the system does not have the capability to provide any audio output for the photographs, the execution of the other modules (corresponding to the recognition of objects in the photographs) can be ignored altogether.

As described below in the next section FAST can be used to specifically identify regions of interest that represent a document, possibly including a structured document or a financial document. Regions of interests that represent structured documents, that is a document of a known structure, can be processed by a template-drive recognition module as discussed below.

The following discussion describes a system for detecting and localizing text regions in images and videos capturing printed page, books, magazine, mail envelope, and receipt in real-time using a smart phone camera. The system includes stages for i) identifying text regions from low-resolution video frames, ii) generating audio feedback to guide a visually impaired personal to capture the entire text region in the scene, iii) triggering the camera to capture a high-resolution still-image of the same scene, iv) recognizing the text regions using optical character recognition tools that run on the mobile device or in the cloud, and v) pronouncing the recognized text using text-to-speech (TTS) module. One aspect of the described technique includes a real-time audio guided feedback to capture an acceptable image for the OCR engine. Methods for corner detection, connected component analysis, and paragraph structure test are used in the text detection module. The algorithm has been tested on an iPhone device where enhanced performance was achieved. The usage simplicity and availability of the application on smart phones will yield advantages over traditional scanner-based OCR systems.

Several systems have been proposed in the past to address the need for a mobile-based text detection and recognition. One type of previous approach seeks to localize isolated text in the wild such as traffic signs or room numbers (or names) in a hallway. Such text detection systems help the visually impaired person navigate independently on the street or within the workplace. The disclosed approach differs from previous approaches by seeking to localize and recognize structured text regions (i.e., regions of interest) such as printed page, magazine, utility bill, and receipt.

Example previous effort that identified text regions include those described in A. Zandifar, P. R. Duraiswami, A. Chahine and L. S. Davis, "A video based interface to textual information for the visually impaired", Fourth IEEE International Conference on Multimodal Interfaces, 2002. Unfortunately, the described system lacks mobility as it requires many devices. It also lacks of any audio feedback mechanism or status update, which make it hard for blind people to use.

Furthermore, Ferreira et al. proposed a text detection and recognition system that runs on a personal digital assistant (PDA) (see S. Ferreira, V. Garin, and B. Gosselin, "A text detection technique applied in the framework of a mobile camera-based application," First International Workshop on Camera-based Document Analysis and Recognition, 2005). Unfortunately, the Ferreira approach fails to provide real-time feedback.

The following disclosed system (see FIG. 7) uses OCR and TTS tools that run on mobile platforms. In addition the disclosed real-time video-based text detection algorithm, aids visually impaired people to quickly understand printed text via image capture and analysis. The main challenge in blind photography is to assist the visually impaired person in capturing an image that contains an entire text region. The disclosed system addresses this issue by utilizing a fast text detection module (e.g., feature invariant identification algorithm) that runs on low-resolution video frames (e.g., digital representation). Furthermore, a bounding box is placed around the detected text region (e.g., region of interest) and an audio feedback is provided to the user to indicate the status of the text in the scene. The system gives verbal feedback, or other audio feedback or tactile feedback, such as "left", "right", "forward", "backward", "zoom-in", or "zoom-out" to help the user move the mobile phone in the space. The system informs the user if the detected text region touches (or has been cut at) any of the boundaries of the captured scene. When the printed text is at the center of the captured scene, a "hold still" audio feedback is sent to the user to eliminate capturing blurry or out-of-focus image. The auto-captured still "high-resolution" image is sent to the OCR engine. An example OCR engine that can be leveraged includes those offered by ABBYY® (see URL www.abbyy.com/mobileocr/). ABBYY is used where it provides enhanced performance when a five (or greater) megapixels image is used. The disclosed system also utilizes a TTS module to speak the recognized text to the user. The system can further enable emailing the captured image and generated text to the user for future reference.

The previous example references providing auditory, verbal feedback to a visually impaired user. However, alternative feedback modalities are also contemplated. The feedback to the user can take on non-verbal feedback, perhaps based on music, audible tempo, or other sounds. Further, the feedback can be visual by providing visual indicators or icons that instruct a user how to position their mobile device. Still further the feedback could include tactile feedback, perhaps in the form of a vibration on the mobile device, which indicates when the device is position properly. A more specific example could include using a cell phones vibration capability to indicate when the device is incorrectly positioned. As the user nears an optimal position, the strength (e.g., frequency, amplitude, etc.) of the vibration might decrease until the optimal position is achieved.

Figure 7:
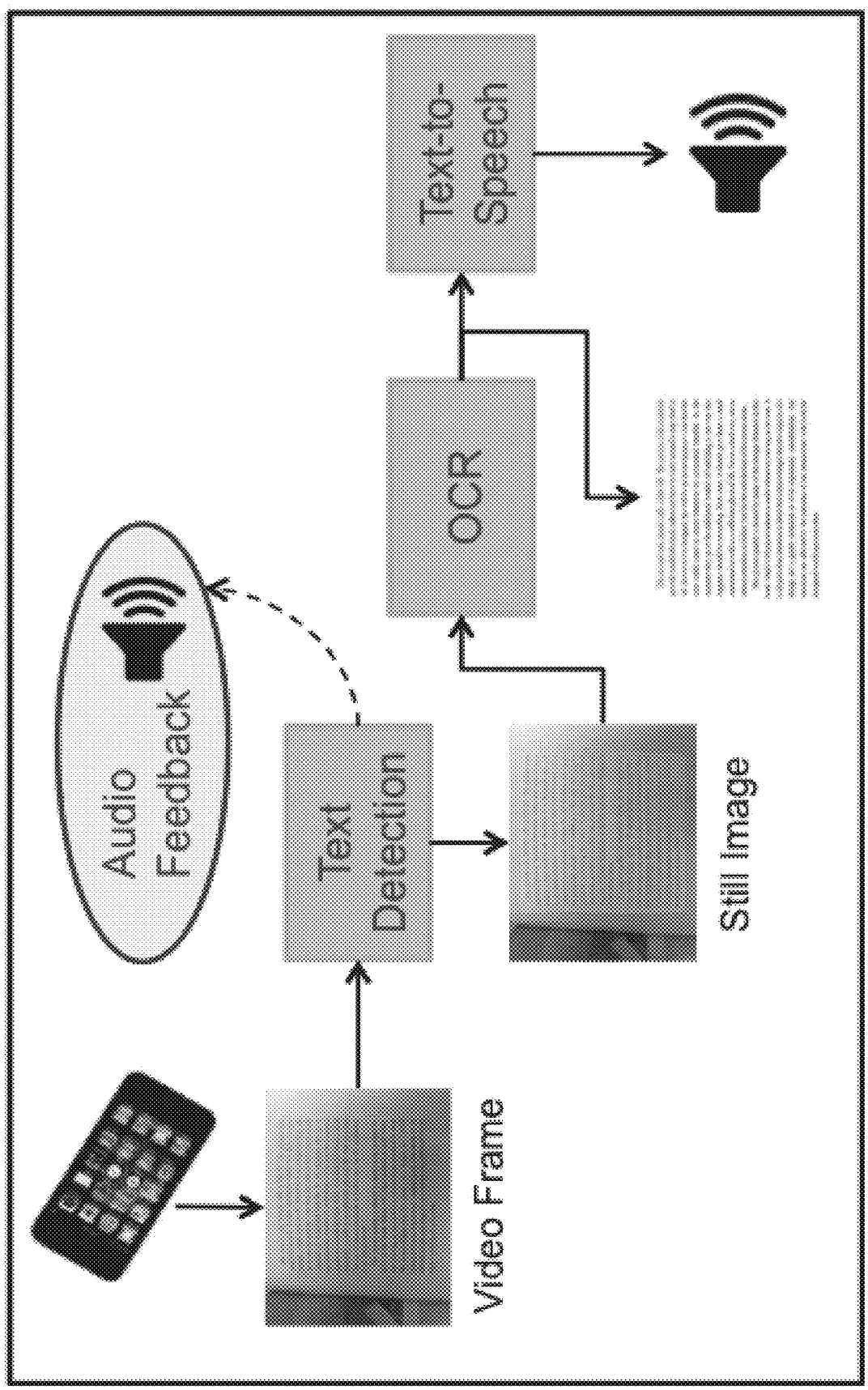
FIG. 7 presents an overview of a system capable of processing documents from video frames.

The system of FIG. 7 has three main modules. A first module include video-based text detection module where texture features of printed text are used to identify text-candidate regions. A paragraph structure test is also utilized to confirm text detection. A second module includes an audio feedback module where a verbal feedback is provided to the user if the text region is cropped or a mobile phone displacement is required. The third module enables the capture of high-resolution still-image, which is sent to the OCR tool. The generated text is spoken to the user via a TTS component.

Figure 8:
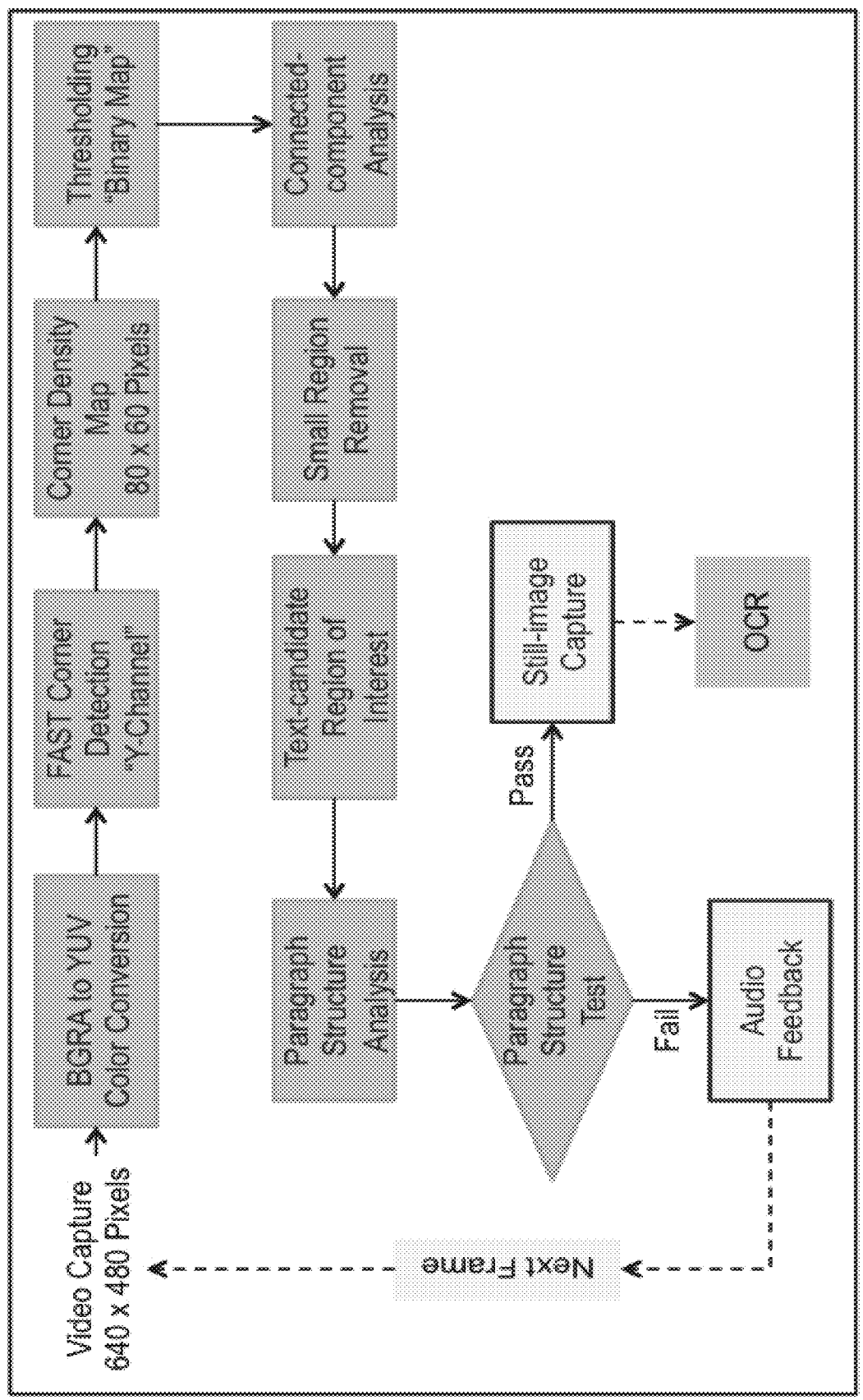
FIG. 8 illustrates a data flow for a possible video-based text detection module.

FIG. 8 presents a block diagram of the video-based text detection module. Note that the disclosed algorithm is designed to detect printed text with sufficient contrast to the background. In some embodiments, the algorithm assumes that the target text shows strong-textured characteristics (small font size) and forms several text lines. To address the first assumption, the FAST corner detection algorithm (e.g., feature identification algorithm) is utilized to find texture regions in the video frames given that the user is pointing the mobile phone camera at printed text. The generated corner map is cut to 8×8 windows where a corner density map is found by averaging the number of corners in each window. The density map is binarized using a global threshold and further processed using connected component analysis and small region elimination. A minimum-bounding box (e.g., a region of interest) is fitted around the main regions, which are tested for paragraph structure and audio feedback is communicated to the user.

FIG. 9 shows a text region of image data with the FAST corner detection map. The original implementation of the FAST algorithm has a post-processing method for non-maximal suppression, that is, to eliminate low-confidence corner points or minimize the number of detected corners in small neighborhood. However, a high-density corner map is a favorable feature when text detection is considered. The document in FIG. 9 is captured using 640×480 pixels, which shows 43,938 corner points. Note that the FAST algorithm is designed to detect corners in gray-scale images. This illustrates a possible need for color space conversion (or color to gray scale conversion) if the input image is captured in RGB (or BGRA in iPhones). More preferred embodiments are optimized by converting BGRA to YUV where the Y-channel is used for corner detection.

Figure 10A:
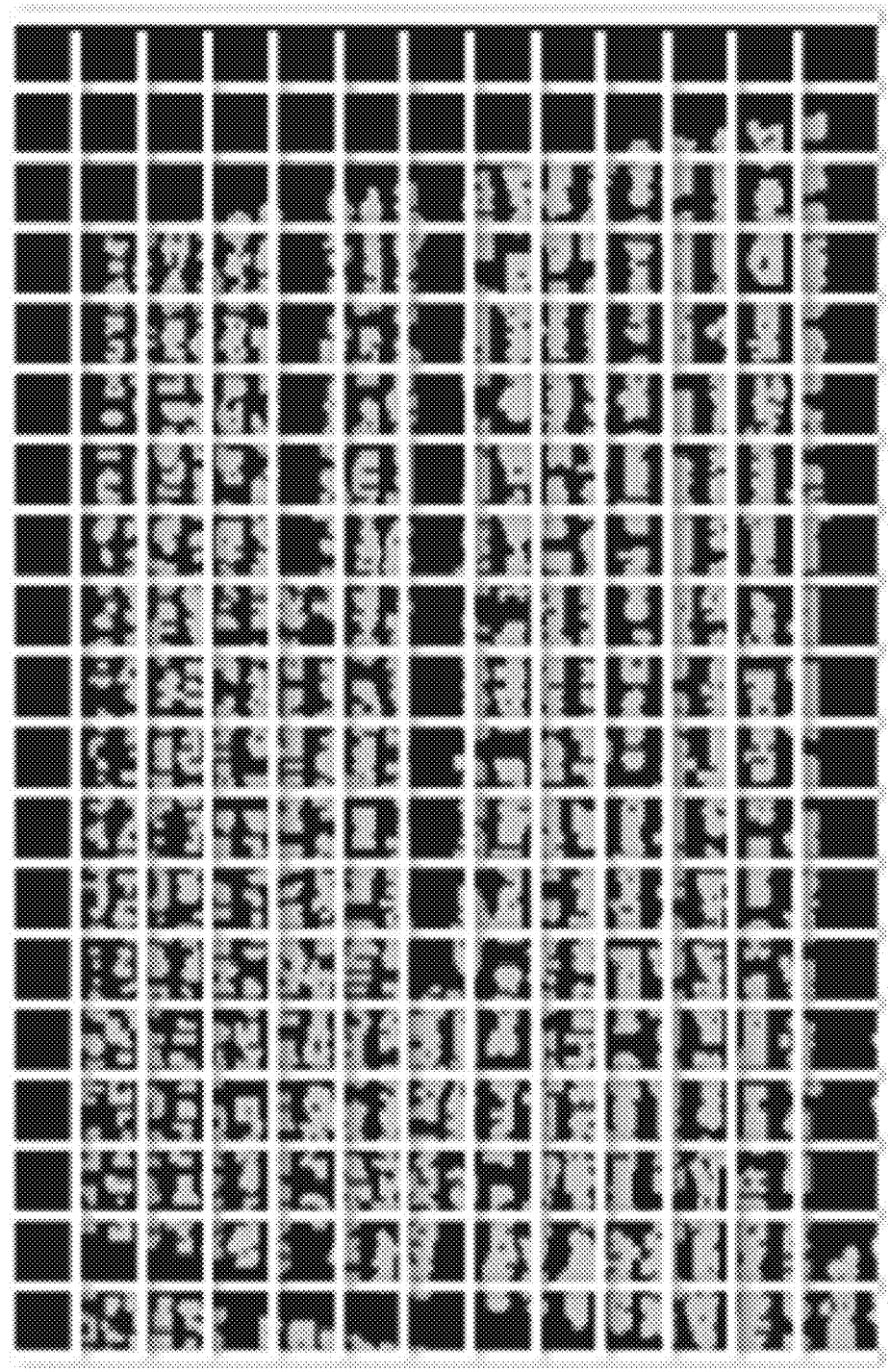
FIGS. 10A-10C illustrate converting features in a region of interest into feature density information in the form of a binary corner density map.
Figure 10B:
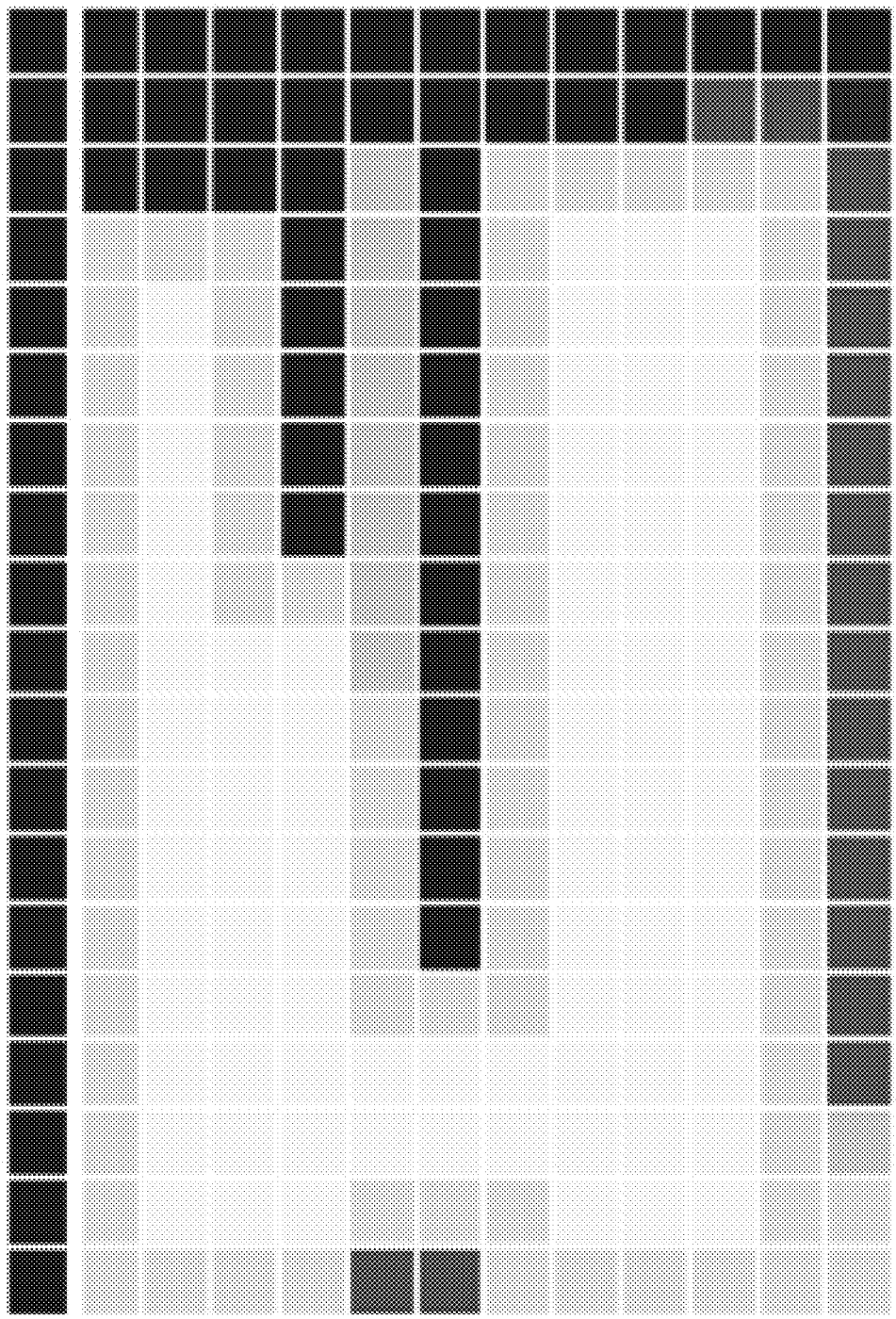
Figure 10C:
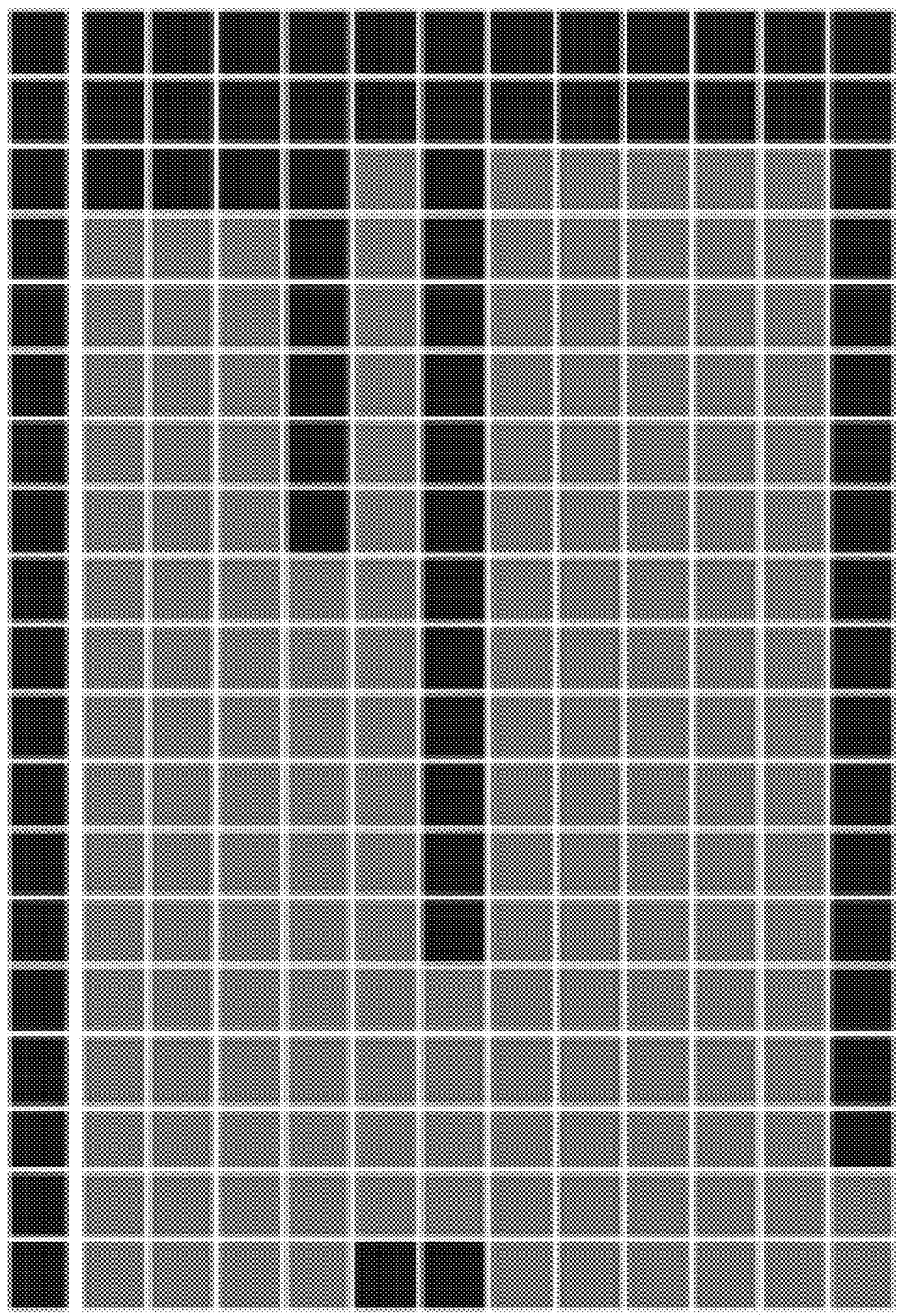

In this module, the corner density map is generated by block processing the corner map based on 8×8 pixel window as shown in FIGS. 10A-10C. The digital count (gray-level) of any small window in the corner density map (FIG. 10B) resembles the number of corners in the corresponding window in the corner map in FIG. 10A. FIG. 10C shows a binary map of FIG. 10B. Note that the size of FIGS. 10A-10C is 80×60 pixels in the current implementation. A connected-component labeling stage is also included in the proposed module to identify the number of text-candidate regions in the view. It also helps identifying small regions that can be eliminated or posing geometrical restrictions on text-candidate regions.

Figure 11A:
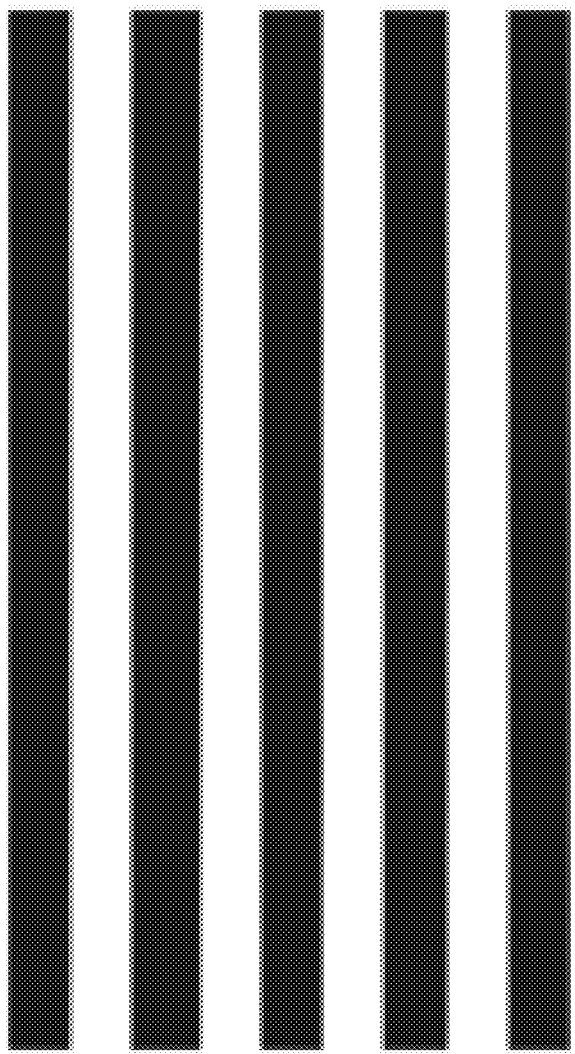
FIGS. 11A-11C provide examples of various substructures within a region of interest where the substructure and associated attributes are derived from feature density information.
Figure 11B:
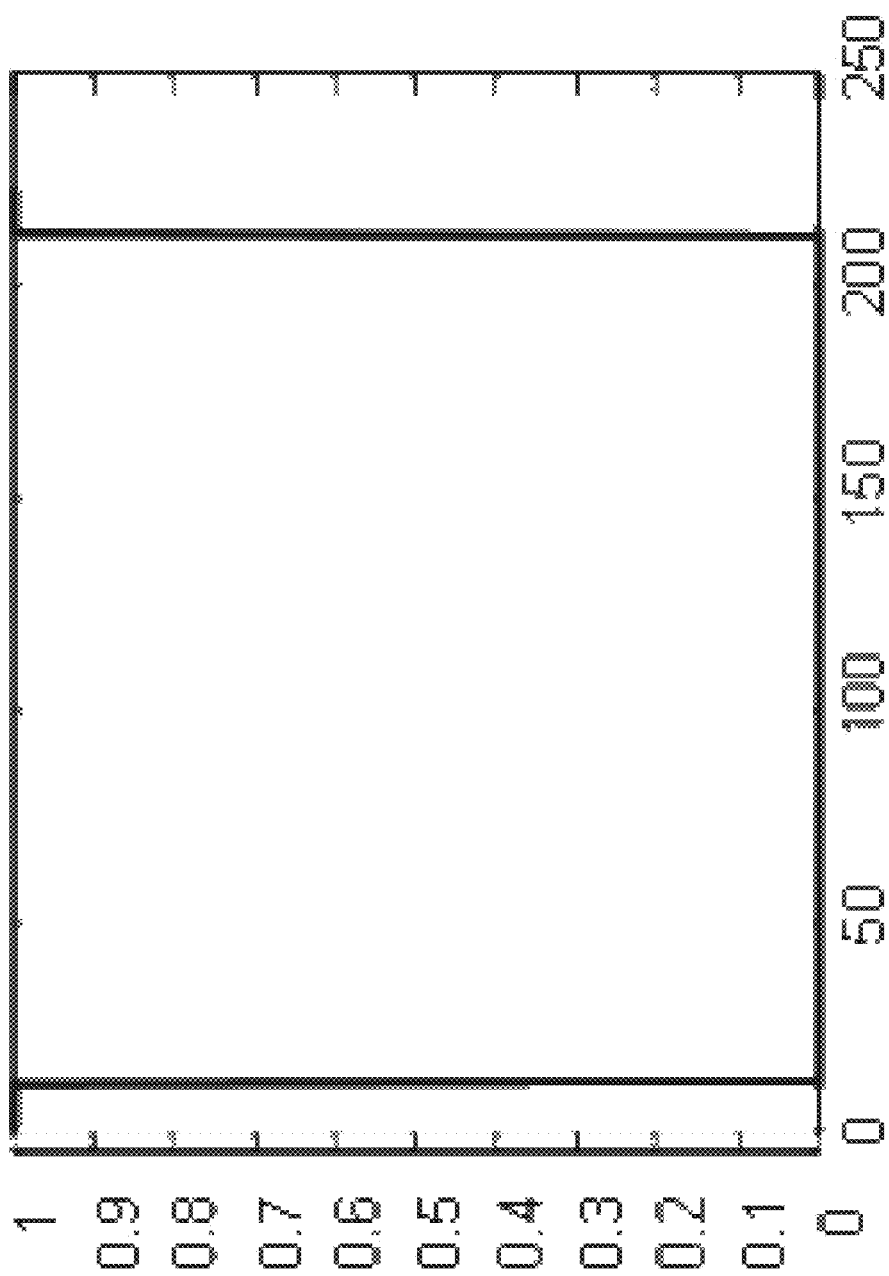
Figure 11C:
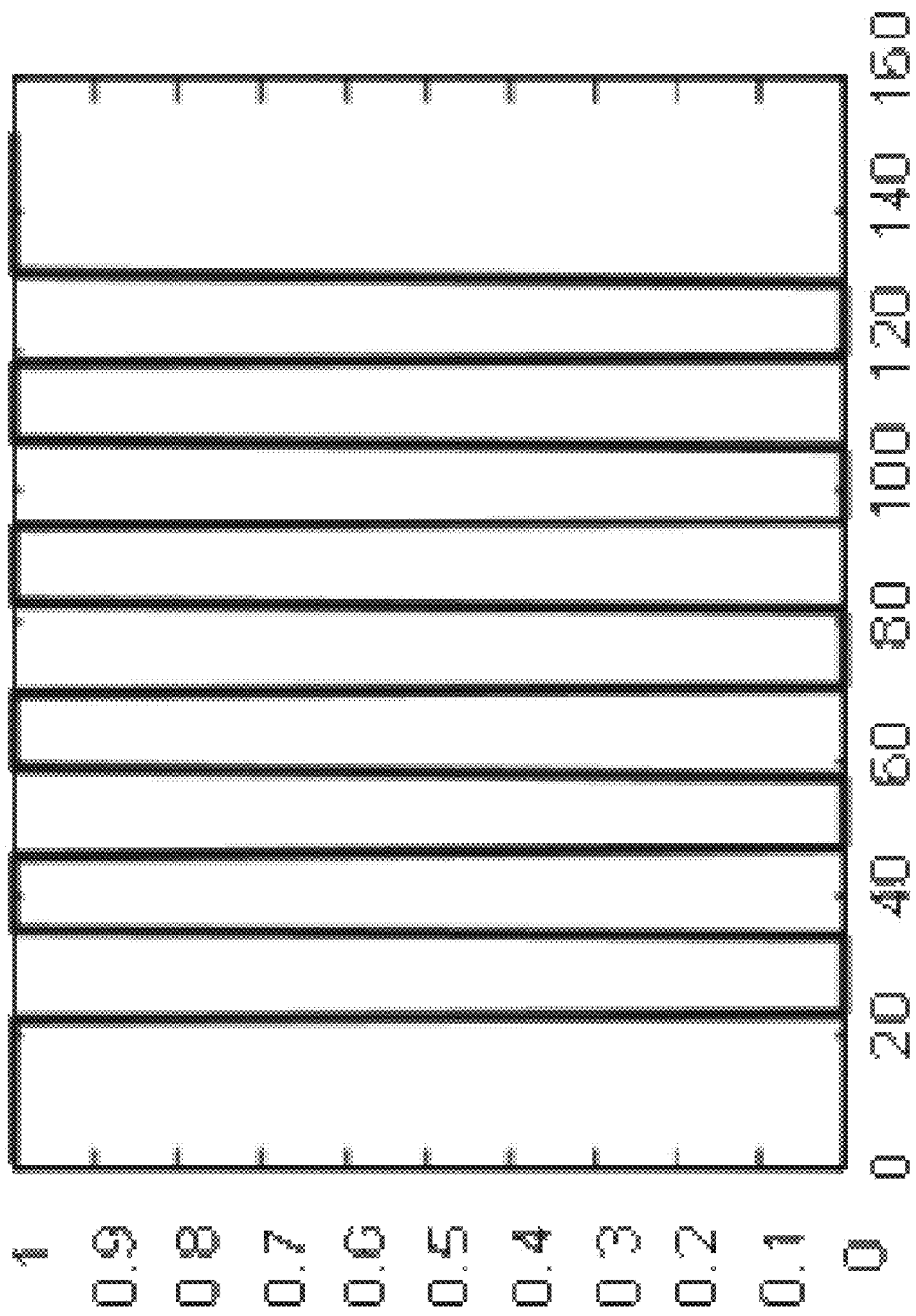

The paragraph structure test (e.g., feature density selection criteria) verifies the text-candidate region based on an assumption that a text region consists of a sentence, multiple sentences, or a paragraph. That is, if any text-candidate region is considered by itself, its structure should generate a set of peaks and valleys of intensity values (e.g., region feature density attributes) if averaged in the horizontal or vertical direction (profile projection). The characteristics of these peaks and valleys of the feature density substructure (shown in FIGS. 11A-11C) indicate the font size used in the written text and the distances between the lines. FIG. 11A corresponds to the input image, FIG. 11B to the normalized vertical projection and FIG. 11C to the normalized horizontal projection. The Run-Length Encoding (RLE) technique is applied to the projection vectors where the mean and standard deviation (STD) of the resulting RLE coefficients are used to perform the paragraph structure test.

Figure 12:
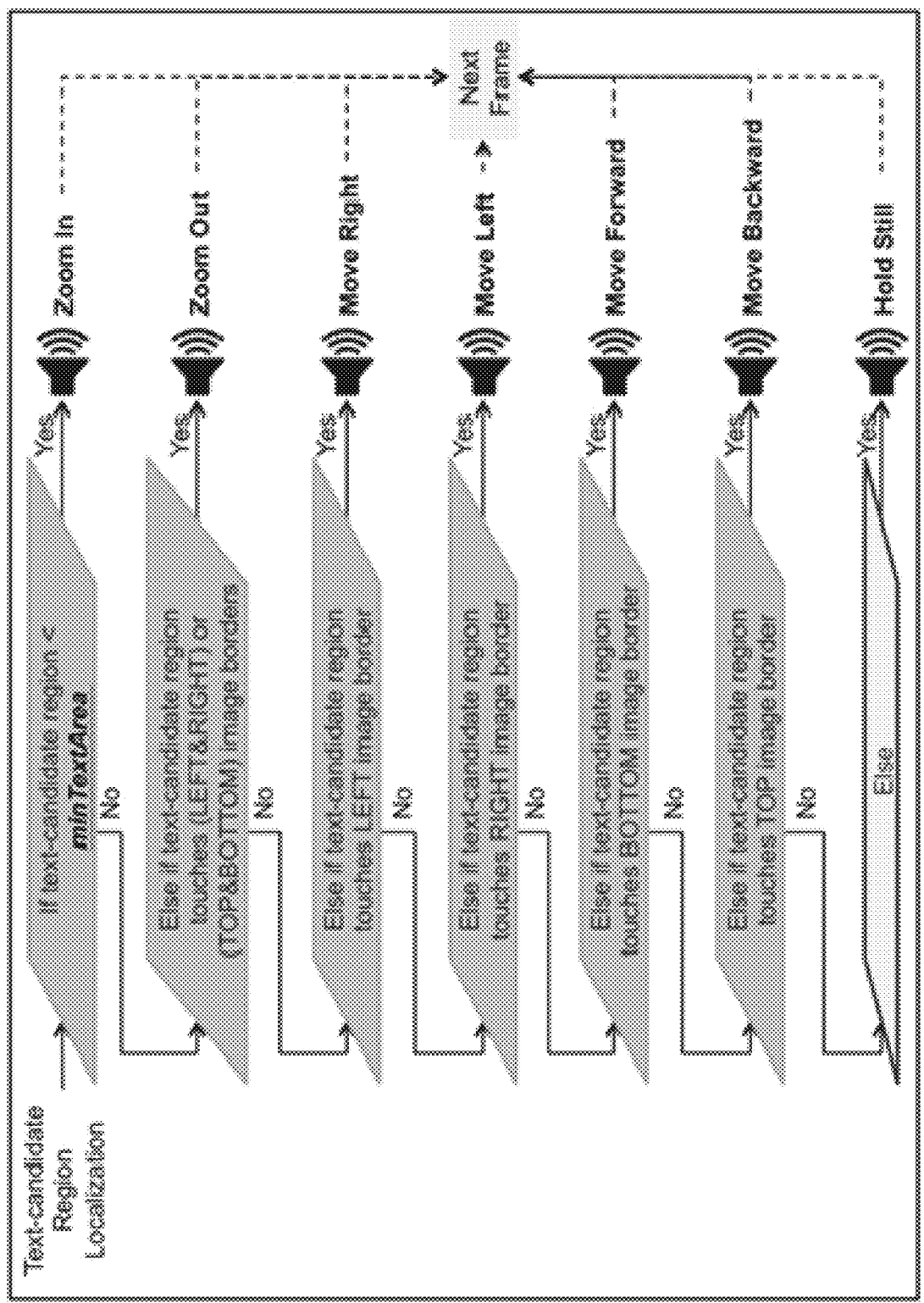
FIG. 12 illustrates a block diagram of an audio feedback module.

One objective of the audio feedback module is to help the user to locate the detected text region so that it is in the camera view. That is, to aid the user to position the text region so that it does not touch any of the image borders and has sufficient size. As shown in FIG. 12, the algorithm firstly checks if the size of the detected-text region is less than an empirically selected threshold (minTextArea), if yes, a "zoom in" audio track is played and the algorithm proceeds to analyze the next frame. However, if the area of the text-candidate region is accepted, the text-candidate boarders are compared to the video frame boundaries to generate a suitable feedback as shown in FIG. 12. Finally, if the text-candidate area has adequate size and is not cropped/clipped, the "hold still" audio track feedback is played while the still-image capture module is initialized.

Figure 13A:
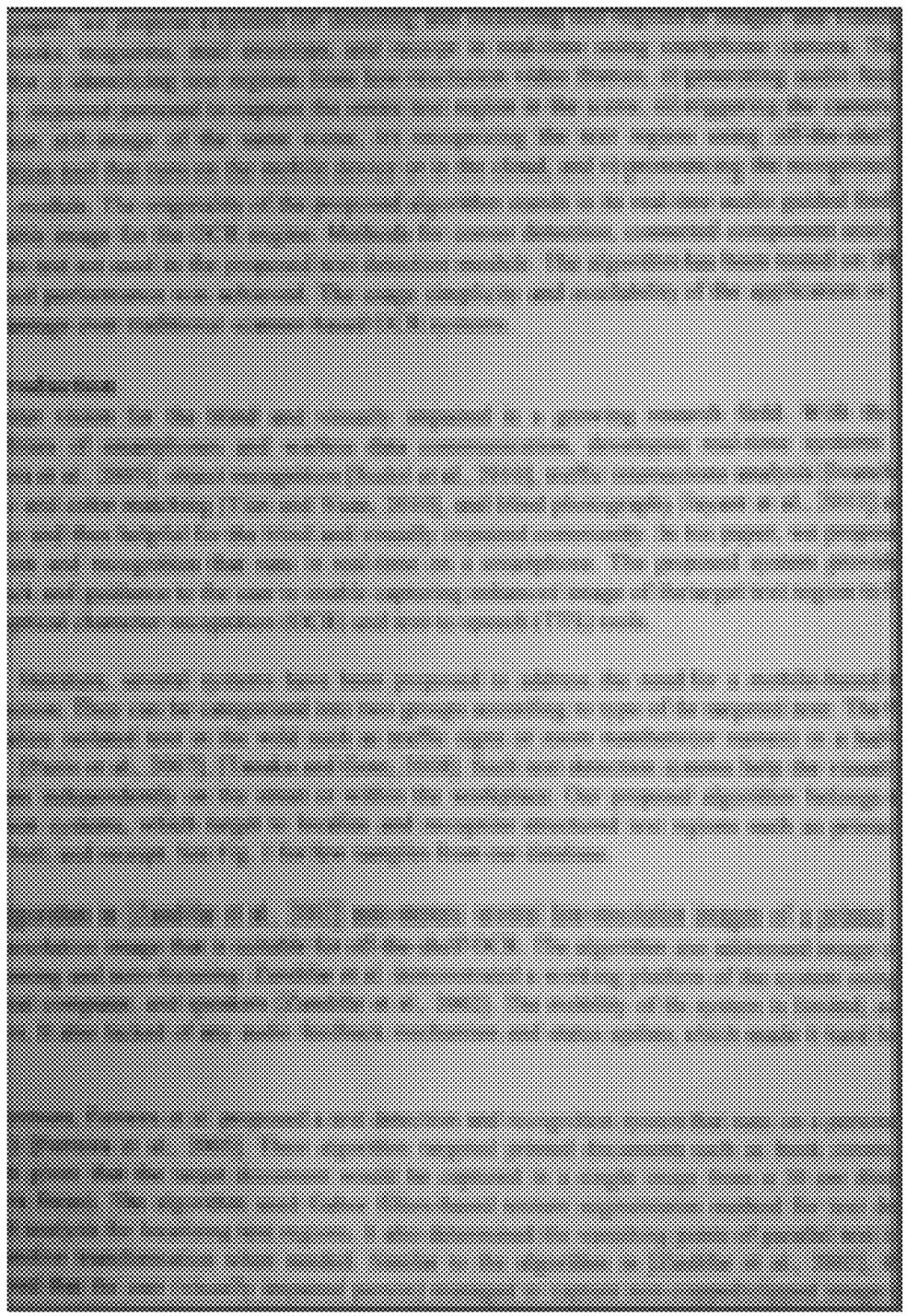
FIGS. 13A-13C illustrate presenting audio and visual feedback to a user indicating if a text region is in an appropriate spot.
Figure 13B:
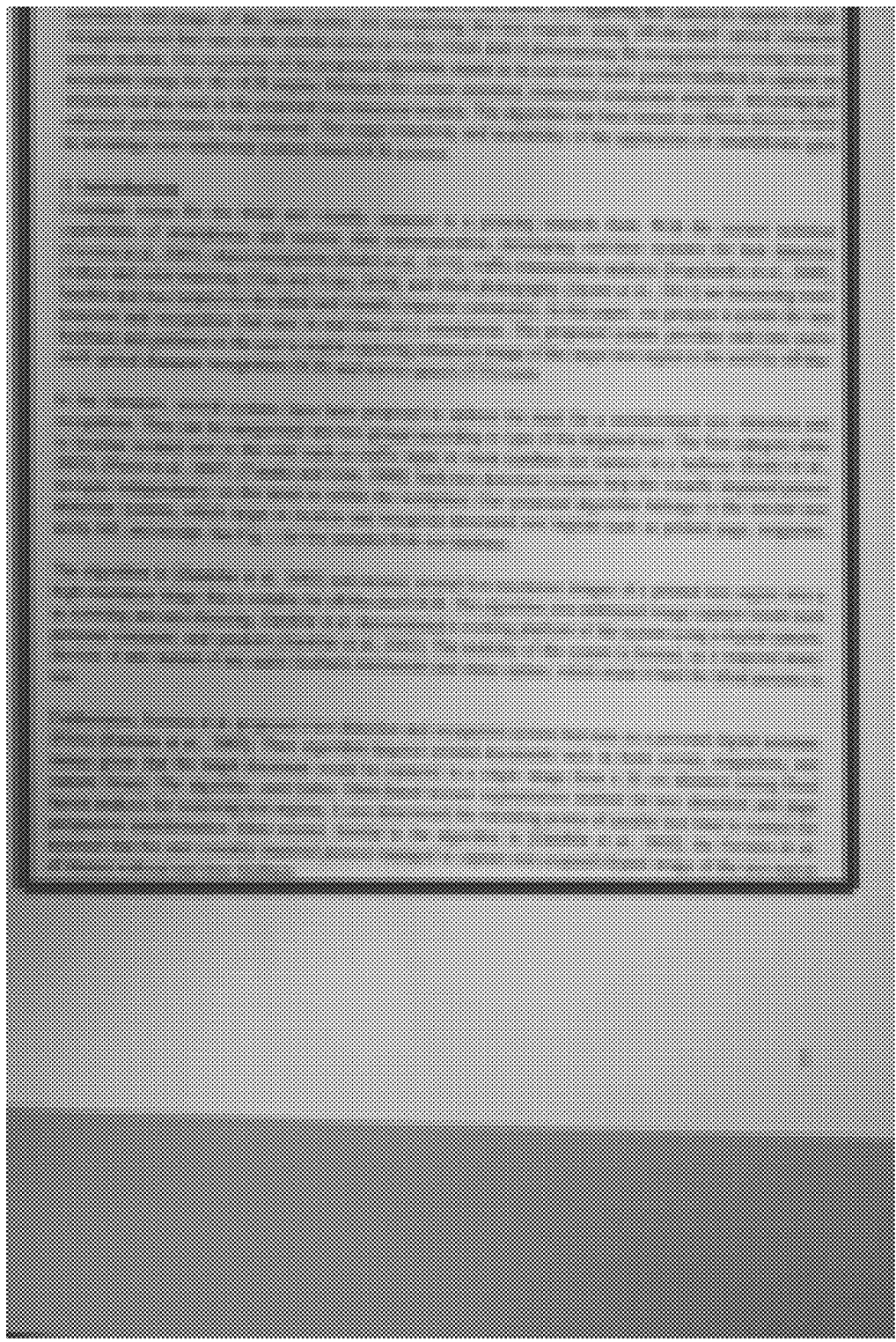
Figure 13C:
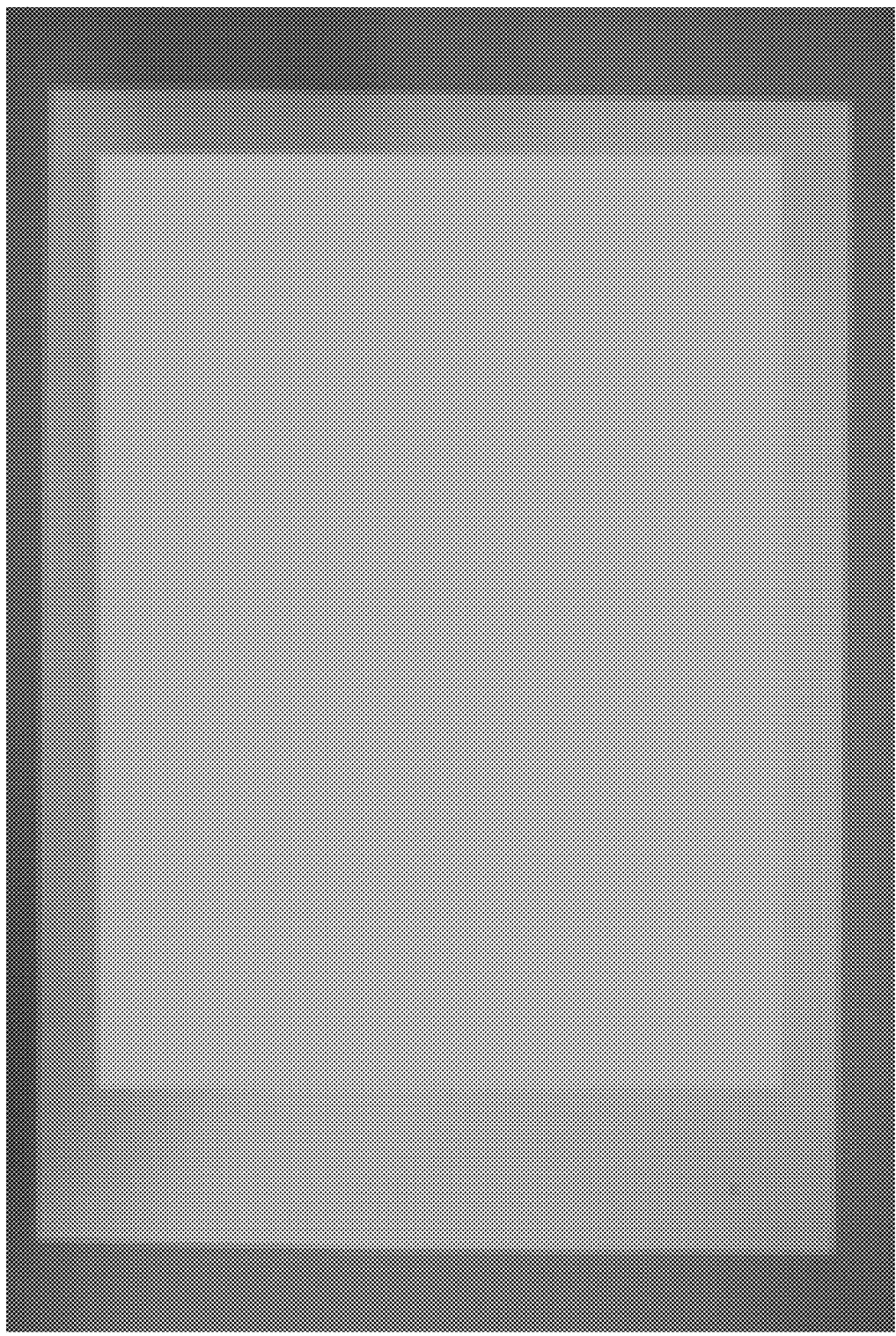

FIGS. 13A-13C illustrate three visual and audio feedback scenarios as given in a current implementation. FIG. 13A corresponds to the zoom out state where the text-candidate borders touch the frame boundaries while FIG. 13B advises the user to move the mobile device forward. Lastly, FIG. 13C resembles the detection of text-region where a "hold still" feedback is given.

Figure 14:
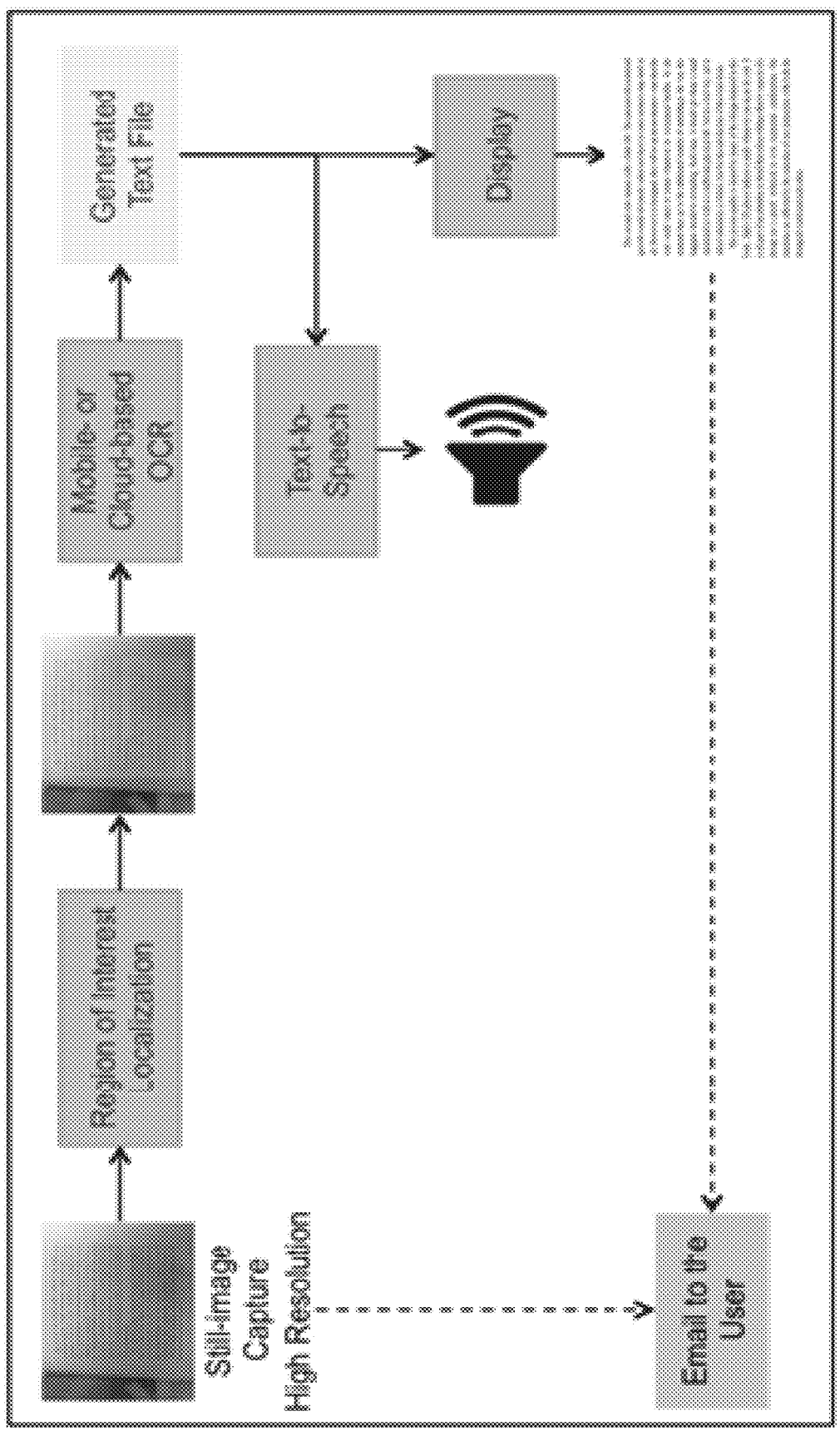
FIG. 14 illustrates a block diagram of still-image capture, OCR, and TTS modules.
Figure 15A:
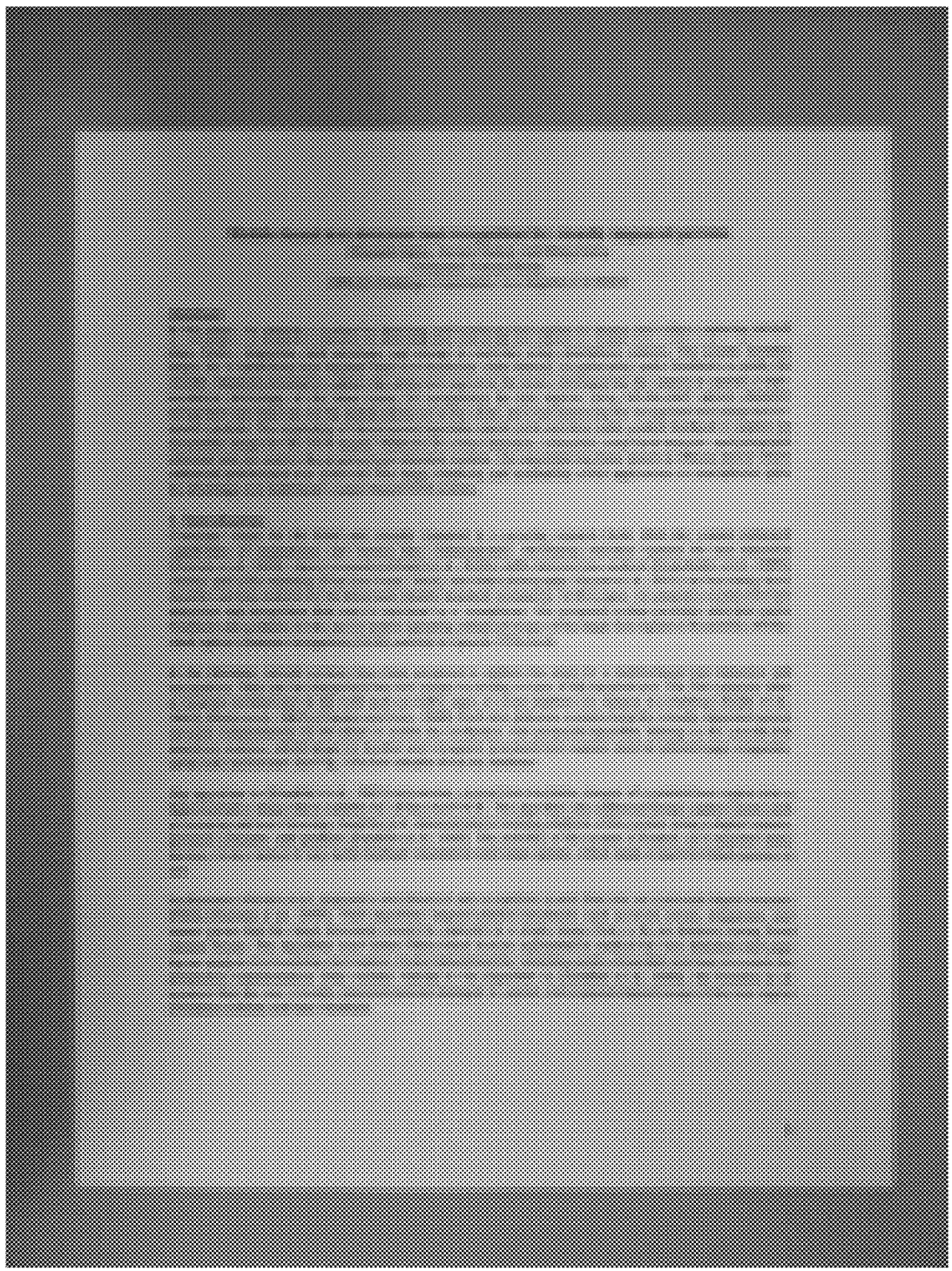
FIGS. 15A-15C presents actual display screens for still images, OCR module interactions, and generated text from a region of interest.
Figure 15B:
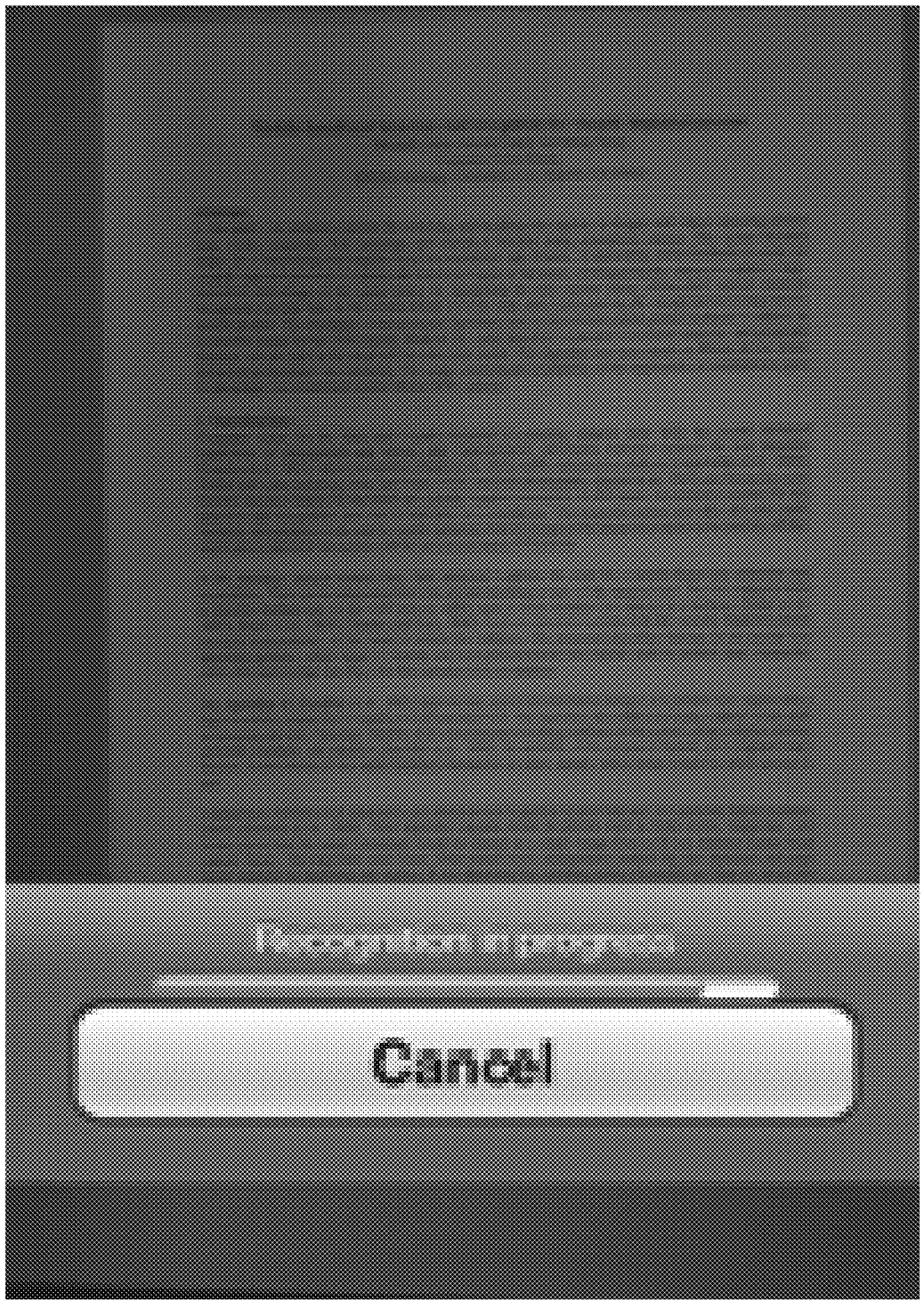
Figure 15C:
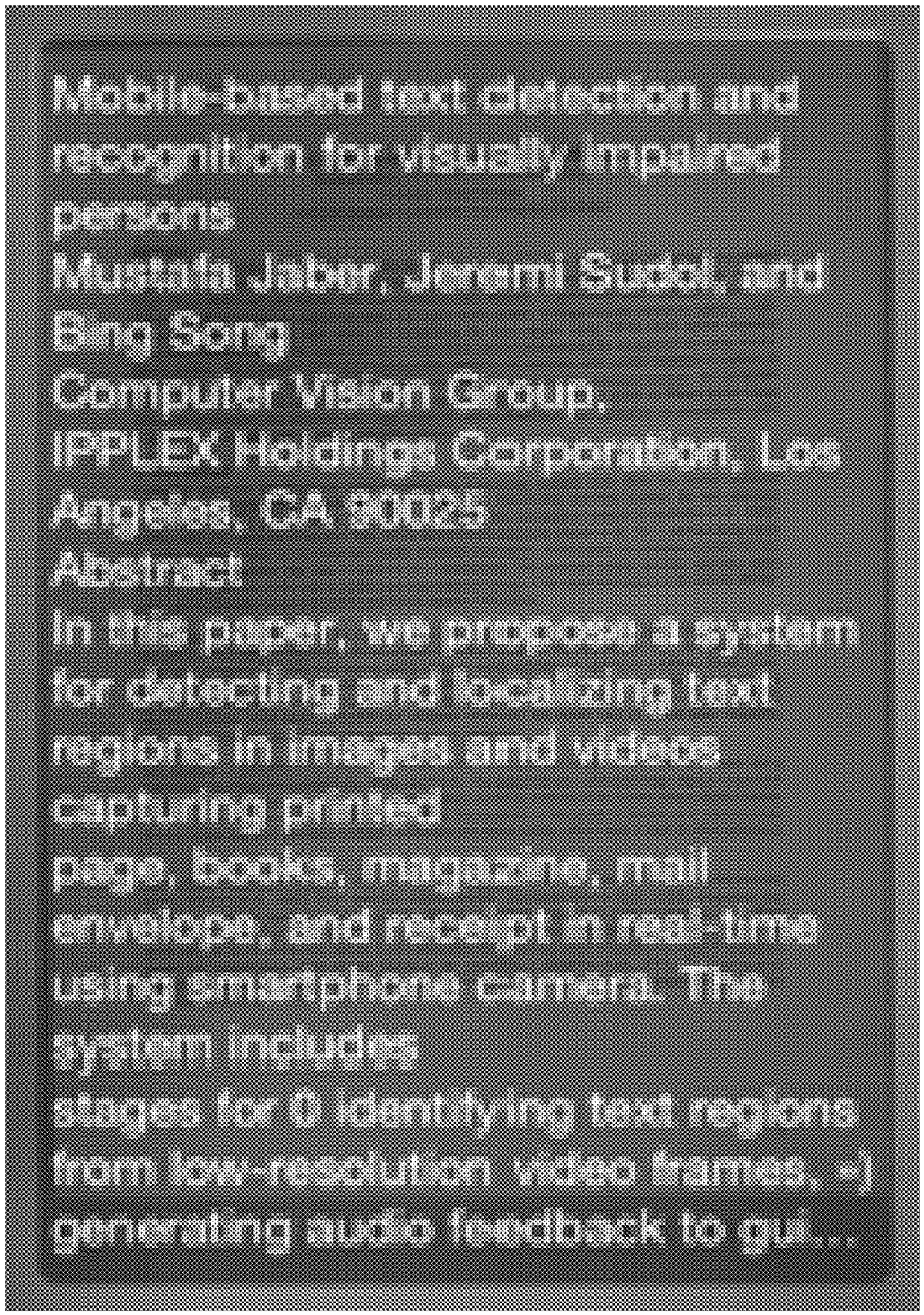

The video-based text detection and audio feedback modules simultaneously run to help the user locating the target text region (e.g., the region of interest). Once the text-candidate region satisfies the conditions for capturing still image, the camera is triggered to capture a high-resolution still image as shown in FIG. 14. Capturing a still-image (FIG. 15A) also requires that the mobile phone be held stable to minimize motion blur. The borders of the target text region that have been detected in the low-resolution video frame are scaled to match the high-resolution still image where the region of interest is extracted. The cut region, or the entire still-image, is sent to the OCR tool (e.g., recognition module). The current implementation leverages a mobile- and general-OCR module from APPYY to run the OCR on a mobile phone. FIG. 15B illustrates a real-time interaction between a mobile-based OCR as well as cloud-based system. Note that an audio feedback is provided to the user about the OCR progress if needed. The recognized text is displayed as shown in FIG. 15C and is also sent to a TTS tool. The user hears the recognized text through the mobile phone speakers.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An object data processing system comprising:
   at least one processor configured to execute:
   at least one implementation of a plurality of recognition algorithms stored on at least one non-transitory computer-readable storage medium, each recognition algorithm having feature density selection criteria; and
   data preprocessing code executed by at least one processor, the data preprocessing code comprising an invariant feature identification algorithm and configured to:
   obtain a digital representation of a scene, the scene comprising one or more textual media;
   generate a set of invariant features by applying the invariant feature identification algorithm to the digital representation;
   cluster the set of invariant features into regions of interest in the digital representation of the scene, each region of interest having a region feature density;
   classify, by region classifier code, at least one of the regions of interest according to object type as a function of attributes derived from the region feature density and the digital representation, wherein the at least one of the classified regions of interest corresponds to text; and
   use a classification result corresponding to the at least one of the regions of interest to classify another of the regions of interest according to object type, wherein the another of the regions of interest corresponds to a region of interest for images.

2. The system of claim 1, wherein preprocessing code, based on the feature density selection criteria, determines that an OCR algorithm is applicable to the text, and that other recognition algorithms are applicable to aspects of the photographs and to logos.

3. The system of claim 1, wherein a user creates a user profile for a camera-equipped smartphone that includes the information that the user is visually impaired, which causes prioritized execution of the OCR algorithm such that a text reader program begins reading the text to the user as quickly as possible.

4. The system of claim 3, further comprising an audio or tactile feedback mechanism that helps the user to position the smart phone relative to the text.

5. The system of claim 4, further comprising a "hold still" audio feedback signal that is sent to the user when the text is at the center of the captured scene.

6. The system of claim 1, wherein the digital representation comprises at least one of the following types of digital data: image data, video data, and audio data.

7. The system of claim 1, wherein invariant feature identification algorithm comprises at least one of the following feature identification algorithms: FAST, SIFT, FREAK, BRISK, Harris, DAISY, and MSER.

8. The system of claim 1, wherein the invariant feature identification algorithm includes at least one of the following: edge detection algorithm, corner detection algorithm, saliency map algorithm, curve detection algorithm, a texton identification algorithm, and wavelets algorithm.

9. The system of claim 1, wherein at least one region of interest represents at least one physical object in the scene.

10. The system of claim 1, wherein at least one region of interest represents at least one textual media in the scene.

11. The system of claim 10, wherein the region of interest represents a document as the textual media.

12. The system of claim 11, wherein the region of interest represents a financial document.

13. The system of claim 11, wherein the region of interest represents a structured document.

14. The system of claim 1, wherein at least one implementation of a plurality of recognition algorithms includes at least one of the following: a template driven algorithm, a face recognition algorithm, an optical character recognition algorithm, a speech recognition algorithm, and an object recognition algorithm.

15. The system of claim 1, wherein data preprocessing code is further configured to assign each region of interest at least one recognition algorithm as a function of a scene context derived from the digital representation.

16. The system of claim 15, wherein the scene context includes at least one of the following types of data: a location, a position, a time, a user identity, a news event, a medical event, and a promotion.

17. The system of claim 1, further comprising a mobile device comprising at least one implementation of a plurality of recognition algorithms and data preprocessing code.

18. The system of claim 17, wherein the mobile device comprises at least one of the following: a smart phone, a tablet, wearable glass, a toy, a vehicle, a computer, and a phablet.

19. The system of claim 1, further comprising a network-accessible server device comprising at least one implementation of a plurality of recognition algorithms and data preprocessing code.

20. The system of claim 1, wherein the object type includes at least one of the following: a face, an animal, a vehicle, a document, a plant, a building, an appliance, clothing, a body part, and a toy.

21. An object data processing system comprising:
   at least one processor configured to execute:
      at least one implementation of a plurality of recognition algorithms stored on at least one non-transitory computer-readable storage medium, each recognition algorithm having feature density selection criteria; and
      data preprocessing code executed by at least one processor, the data preprocessing code comprising an invariant feature identification algorithm and configured to:
         obtain a digital representation of a scene, the scene comprising one or more textual media;
         generate a set of invariant features by applying the invariant feature identification algorithm to the digital representation;
         cluster the set of invariant features into regions of interest in the digital representation of the scene, each region of interest having a region feature density;
         classify, by region classifier code, at least one of the regions of interest according to object type as a function of attributes derived from the region feature density and the digital representation; wherein the at least one of the classified regions of interest corresponds to text; and
         use a classification result corresponding to the at least one of the regions of interest to classify another of the regions of interest according to object type, wherein the another of the regions of interest corresponds to a region of interest for images;
         assign each region of interest at least one recognition algorithm from at least one implementation of a plurality of diverse recognition algorithms as a function of the region feature density of each region of interest and the feature density selection criteria of the at least one implementation of a plurality of diverse recognition algorithms; and
         configure the assigned recognition algorithms to process their respective regions of interest, wherein preprocessing code, based on the feature density selection criteria, determines that an OCR algorithm is applicable to the text, and that other recognition algorithms are applicable to aspects of the photographs and to logos.

22. A device comprising:
   at least one processor configured to execute:
      at least one implementation of a plurality of recognition algorithms stored on at least one non-transitory computer-readable storage medium, each recognition algorithm having feature density selection criteria; and
      data preprocessing code executed by at least one processor, the data preprocessing code comprising an invariant feature identification algorithm and configured to:
         obtain a digital representation of a scene, the scene comprising one or more textual media;
         generate a set of invariant features by applying the invariant feature identification algorithm to the digital representation;
         cluster the set of invariant features into regions of interest in the digital representation of the scene, each region of interest having a region feature density; and
         classify, by region classifier code, at least one of the regions of interest according to object type as a function of attributes derived from the region feature density and the digital representation, wherein the at least one of the classified regions of interest corresponds to text; and
         use a classification result corresponding to the at least one of the regions of interest to classify another of the regions of interest according to object type, wherein the another of the regions of interest corresponds to a region of interest for images.

* * * * *